(12) United States Patent
Ma et al.

(10) Patent No.: US 12,477,369 B2
(45) Date of Patent: Nov. 18, 2025

(54) REPORTING NEIGHBORING CELL INTERFERENCE DUE TO BEAM JAMMING

(71) Applicant: QUALCOMM Incorporated, San Diego, CA (US)

(72) Inventors: Ruifeng Ma, Beijing (CN); Jay Kumar Sundararajan, San Diego, CA (US); Yeliz Tokgoz, San Diego, CA (US); Hwan Joon Kwon, San Diego, CA (US); Naga Bhushan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 400 days.

(21) Appl. No.: 17/997,727

(22) PCT Filed: Jul. 2, 2020

(86) PCT No.: PCT/CN2020/099954
§ 371 (c)(1),
(2) Date: Nov. 1, 2022

(87) PCT Pub. No.: WO2022/000428
PCT Pub. Date: Jan. 6, 2022

(65) Prior Publication Data
US 2023/0189040 A1    Jun. 15, 2023

(51) Int. Cl.
*H04W 4/00* (2018.01)
*H04B 17/336* (2015.01)
(Continued)

(52) U.S. Cl.
CPC .......... *H04W 24/10* (2013.01); *H04B 17/336* (2015.01); *H04L 5/0051* (2013.01); *H04W 72/21* (2023.01); *H04W 72/23* (2023.01)

(58) Field of Classification Search
None
See application file for complete search history.

(56) References Cited

U.S. PATENT DOCUMENTS 9,668,265 B2 * 5/2017 Palanki ............... H04W 72/541
9,838,899 B2 * 12/2017 Park ...................... H04L 5/0057
(Continued)

FOREIGN PATENT DOCUMENTS

| CN | 102413501 A | 4/2012 |
| EP | 3313011 A1 | 4/2018 |

(Continued)

OTHER PUBLICATIONS

International Search Report and Written Opinion—PCT/CN2020/099954—ISA/EPO—Apr. 1, 2021.
(Continued)

*Primary Examiner* — Bob A Phunkulh
(74) *Attorney, Agent, or Firm* — Holland & Hart LLP

(57) ABSTRACT

Methods, systems, and devices for wireless communications are described. The described techniques provide for a first base station transmitting a control message to a user equipment (UE). The control message may include an indication to perform a measurement during one or more resources associated with the first base station and that correspond to a second base station. The UE may measure reference signals transmitting via the beam of the second base station and during the time and frequency resources of the first base station. Based on the measurements, the UE determine an interference status correspond to the beam of the second base station and transmits an indication of the interference status to the first base station.

53 Claims, 14 Drawing Sheets

(51) Int. Cl.
  *H04L 5/00* (2006.01)
  *H04W 24/10* (2009.01)
  *H04W 72/21* (2023.01)
  *H04W 72/23* (2023.01)

(56) References Cited

U.S. PATENT DOCUMENTS

| | | | |
|---|---|---|---|
| 2010/0279619 A1* | 11/2010 | Yeh | H04B 7/024 |
| | | | 455/63.1 |
| 2016/0006529 A1* | 1/2016 | Yi | H04L 5/0044 |
| | | | 370/329 |
| 2017/0006613 A1* | 1/2017 | Kakishima | H04B 7/024 |
| 2018/0227031 A1 | 8/2018 | Guo et al. | |
| 2019/0082438 A1 | 3/2019 | John Wilson et al. | |
| 2019/0103928 A1 | 4/2019 | Nagaraja et al. | |
| 2019/0230549 A1* | 7/2019 | Wang | H04B 7/0639 |
| 2019/0238282 A1* | 8/2019 | Cao | H04J 11/00 |
| 2020/0022010 A1* | 1/2020 | Kim | H04W 24/02 |
| 2020/0045572 A1* | 2/2020 | Yum | H04W 72/0446 |
| 2020/0145153 A1* | 5/2020 | Ma | H04L 5/0032 |
| 2021/0345141 A1* | 11/2021 | Cao | H04L 5/0073 |
| 2021/0400510 A1* | 12/2021 | Sha | H04W 24/10 |
| 2021/0409174 A1* | 12/2021 | Yum | H04L 5/0048 |
| 2022/0094498 A1* | 3/2022 | Liu | H04W 72/541 |
| 2022/0286185 A1* | 9/2022 | Zhang | H04B 17/336 |
| 2025/0105993 A1* | 3/2025 | Li | H04W 72/1263 |

FOREIGN PATENT DOCUMENTS

| | | |
|---|---|---|
| WO | WO-2018171002 A1 | 9/2018 |
| WO | WO-2020108502 A1 | 6/2020 |

OTHER PUBLICATIONS

Nokia: "Discussion on NR Remote Interference Mitigation Schemes", 3GPP TSG-RAN WG1 Meeting #95, R1-1813466, Spokane, WA, USA, Nov. 12, 2018-Nov. 16, 2018, 4 Pages, Nov. 16, 2018 (Nov. 16, 2018) the whole document.

Kaikkonen J., et al., "Main Radio Interface Related System Procedures", A Beam-based Air Interface, Apr. 24, 2020, XP093106593, pp. 261-396, Paragraph [04.3], Figure 4.58.

Supplementary European Search Report—EP20943473—Search Authority—Munich—Mar. 6, 2024.

* cited by examiner

REPORTING NEIGHBORING CELL INTERFERENCE DUE TO BEAM JAMMING

CROSS REFERENCE

The present Application is a 371 national stage filing of International PCT Application No. PCT/CN2020/099954 by M A et al. entitled "REPORTING NEIGHBORING CELL INTERFERENCE DUE TO BEAM JAMMING," filed Jul. 2, 2020, which is assigned to the assignee hereof, and which is expressly incorporated by reference in its entirety herein.

FIELD OF TECHNOLOGY

The following relates generally to wireless communications and more specifically to reporting neighboring cell interference due to beam jamming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Beamforming may be used to increase signal reliability and efficiency in wireless communications systems. In some cases, communications on beams associated with different cells or different base stations may interfere with each other. For example, in two neighboring cells, each with respective UEs that are relatively co-located such that the beams from the respective cells are directed toward both UEs, both UEs may suffer from strong interference from transmissions on the other beams. Currently, both UEs may report relatively poor cell quality measurements, but these reports may not specify a beam or direction that is causing the interference.

SUMMARY

The described techniques relate to improved methods, systems, devices, and apparatuses that support reporting neighboring cell interference due to beam jamming. Generally, the described techniques provide for a first base station transmitting a control message to a user equipment (UE). The control message may include an indication to perform a measurement during one or more resources associated with the first base station and that correspond to a second base station. The UE may measure reference signals transmitted via the beam of the second base station and during the time and frequency resources of the first base station. Based on the measurements, the UE may determine an interference status corresponding to the beam of the second base station and transmit an indication of the interference status to the first base station.

A method of wireless communications at a UE is described. The method may include receiving, from a first base station serving the UE, a control message that includes an indication to perform a measurement during one or more resources of the first base station that correspond to a beam of a second base station, the one or more resources of the first base station being time and frequency resource, measuring, based on receiving the control message, a reference signal transmitted via the beam of the second base station and during the one or more resources, determining an interference status that corresponds to the one or more resources of the first base station and the beam of the second base station based on measurements of the reference signal, and transmitting, to the first base station, an indication of the interference status associated with and the one or more resources and the beam of the second base station.

An apparatus for wireless communications at a UE is described. The apparatus may include a processor, memory coupled with the processor, and instructions stored in the memory. The instructions may be executable by the processor to cause the apparatus to receive, from a first base station serving the UE, a control message that includes an indication to perform a measurement during one or more resources of the first base station that correspond to a beam of a second base station, the one or more resources of the first base station being time and frequency resource, measure, based on receiving the control message, a reference signal transmitted via the beam of the second base station and during the one or more resources, determine an interference status that corresponds to the one or more resources of the first base station and the beam of the second base station based on measurements of the reference signal, and transmit, to the first base station, an indication of the interference status associated with and the one or more resources and the beam of the second base station.

Another apparatus for wireless communications at a UE is described. The apparatus may include means for receiving, from a first base station serving the UE, a control message that includes an indication to perform a measurement during one or more resources of the first base station that correspond to a beam of a second base station, the one or more resources of the first base station being time and frequency resource, measuring, based on receiving the control message, a reference signal transmitted via the beam of the second base station and during the one or more resources, determining an interference status that corresponds to the one or more resources of the first base station and the beam of the second base station based on measurements of the reference signal, and transmitting, to the first base station, an indication of the interference status associated with and the one or more resources and the beam of the second base station.

A non-transitory computer-readable medium storing code for wireless communications at a UE is described. The code may include instructions executable by a processor to receive, from a first base station serving the UE, a control message that includes an indication to perform a measurement during one or more resources of the first base station that correspond to a beam of a second base station, the one or more resources of the first base station being time and frequency resource, measure, based on receiving the control message, a reference signal transmitted via the beam of the second base station and during the one or more resources, determine an interference status that corresponds to the one or more resources of the first base station and the beam of the second base station based on measurements of the reference signal, and transmit, to the first base station, an indication of the interference status associated with and the one or more resources and the beam of the second base station.

In some examples of the method, apparatuses, and non-transitory computer-readable medium described herein, determining the interference status may include operations, features, means, or instructions for determining the interference status corresponding to each resource of the one or more resources based on the measurements of the reference signal transmitted during each resource of the one or more resources in accordance with the indication, each resource of the one or more resources corresponding to a reference signal resource of the second base station.

In some examples of the method, apparatuses, and non-transitory computer-readable medium described herein, determining the interference status may include operations, features, means, or instructions for determining the interference status for a combination of the one or more resources based on the measurements of the reference signal transmitting during each resource of the one or more resources in accordance with the indication, each resource of the one or more resources corresponding to a reference signal resource of the second base station.

Some examples of the method, apparatuses, and non-transitory computer-readable medium described herein may further include operations, features, means, or instructions for determining that the one or more resources correspond to zero-power transmission resources for the first base station and the UE.

Some examples of the method, apparatuses, and non-transitory computer-readable medium described herein may further include operations, features, means, or instructions for comparing a measured interference power corresponding to the reference signal to an interference power threshold, the interference status being determined based on the comparing.

In some examples of the method, apparatuses, and non-transitory computer-readable medium described herein, the interference status may be determined to be valid based on the measured interference power exceeding the threshold in accordance with the comparing.

In some examples of the method, apparatuses, and non-transitory computer-readable medium described herein, the interference status may be determined to be invalid based on the measured interference power not exceeding the threshold in accordance with the comparing.

In some examples of the method, apparatuses, and non-transitory computer-readable medium described herein, determining the interference status may include operations, features, means, or instructions for determining the interference status for a frequency band including a set of subbands based on the measurements in accordance with the indication.

In some examples of the method, apparatuses, and non-transitory computer-readable medium described herein, determining the interference status may include operations, features, means, or instructions for determining the interference status for each subband of a set of subbands based on the measurements in accordance with the indication.

In some examples of the method, apparatuses, and non-transitory computer-readable medium described herein, transmitting the indication of the interference status may include operations, features, means, or instructions for transmitting a bitmap, each value of the bitmap corresponding to a respective subband of the set of subbands and indicating the interference status of the respective subband.

In some examples of the method, apparatuses, and non-transitory computer-readable medium described herein, determining the interference status may include operations, features, means, or instructions for determining a quantized value of an interference level based on the measurements, where the quantized value may be transmitted to the first base station.

In some examples of the method, apparatuses, and non-transitory computer-readable medium described herein, receiving the control message may include operations, features, means, or instructions for receiving the control message that includes an indication of a resource block group size, the one or more resources begin determined based on the indication of the resource block group size.

Some examples of the method, apparatuses, and non-transitory computer-readable medium described herein may further include operations, features, means, or instructions for determining the resource block group size based on a default resource block group size in accordance with the indication of the resource block group size.

In some examples of the method, apparatuses, and non-transitory computer-readable medium described herein, the determined resource block size may be a multiple of the default resource block group size in accordance with the indication of the resource block group size.

Some examples of the method, apparatuses, and non-transitory computer-readable medium described herein may further include operations, features, means, or instructions for determining the resource block group size in accordance with a value specified by the indication of the resource block group size.

Some examples of the method, apparatuses, and non-transitory computer-readable medium described herein may further include operations, features, means, or instructions for determining a subband size of a subband for the interference status based on the indication of the resource block group size.

In some examples of the method, apparatuses, and non-transitory computer-readable medium described herein, each the one or more resources corresponds to an instance the reference signal being transmitting using a different beam by the second base station.

A method of wireless communications at a first base station is described. The method may include transmitting, to a UE served by the first base station, a control message that includes an indication to perform an interference measurement during one or more resources of the first base station that correspond to a beam of a second base station, the one or more resources of the first base station being time and frequency resources, receiving, from the UE, an indication of an interference status associated with and the one or more resources of the first base station and the beam of the second base station, and communicating with the UE based on the indication of the interference status.

An apparatus for wireless communications at a first base station is described. The apparatus may include a processor, memory coupled with the processor, and instructions stored in the memory. The instructions may be executable by the processor to cause the apparatus to transmit, to a UE served by the first base station, a control message that includes an indication to perform an interference measurement during one or more resources of the first base station that correspond to a beam of a second base station, the one or more resources of the first base station being time and frequency resources, receive, from the UE, an indication of an interference status associated with and the one or more resources of the first base station and the beam of the second base station, and communicate with the UE based on the indication of the interference status.

Another apparatus for wireless communications at a first base station is described. The apparatus may include means for transmitting, to a UE served by the first base station, a control message that includes an indication to perform an interference measurement during one or more resources of the first base station that correspond to a beam of a second base station, the one or more resources of the first base station being time and frequency resources, receiving, from the UE, an indication of an interference status associated with and the one or more resources of the first base station and the beam of the second base station, and communicating with the UE based on the indication of the interference status.

A non-transitory computer-readable medium storing code for wireless communications at a first base station is described. The code may include instructions executable by a processor to transmit, to a UE served by the first base station, a control message that includes an indication to perform an interference measurement during one or more resources of the first base station that correspond to a beam of a second base station, the one or more resources of the first base station being time and frequency resources, receive, from the UE, an indication of an interference status associated with and the one or more resources of the first base station and the beam of the second base station, and communicate with the UE based on the indication of the interference status.

In some examples of the method, apparatuses, and non-transitory computer-readable medium described herein, transmitting the control message may include operations, features, means, or instructions for including, within the control message, the indication to report the interference status corresponding to each resource of the one or more resources, each resource of the one or more resources corresponding to a reference signal resource of the second base station.

In some examples of the method, apparatuses, and non-transitory computer-readable medium described herein, transmitting the control message may include operations, features, means, or instructions for including, within the control message, the indication to report the interference status corresponding to a combination of the one or more resources, each resource of the one or more resources corresponding to a reference signal resource of the second base station.

Some examples of the method, apparatuses, and non-transitory computer-readable medium described herein may further include operations, features, means, or instructions for transmitting an indication that each of the one or more resources corresponds to zero-power transmission resources for the first base station and the UE.

In some examples of the method, apparatuses, and non-transitory computer-readable medium described herein, transmitting the control message may include operations, features, means, or instructions for including, within the control message, the indication to report the interference status based on comparing a measured interference power to an interference power threshold.

In some examples of the method, apparatuses, and non-transitory computer-readable medium described herein, transmitting the control message may include operations, features, means, or instructions for including, within the control message, the indication to report the interference status for a frequency band including a set a subbands, where the indication of the interference status may be received for the frequency band in accordance with the indication.

In some examples of the method, apparatuses, and non-transitory computer-readable medium described herein, transmitting the control message may include operations, features, means, or instructions for including, within the control message, the indication to report the interference status for each subband of a set of subbands, where the indication of the interference status may be received for each subband of the set of subbands in accordance with the indication.

In some examples of the method, apparatuses, and non-transitory computer-readable medium described herein, receiving the indication of the interference status may include operations, features, means, or instructions for receiving a bitmap, each value of the bitmap corresponding to a respective subband of a set of subbands and indicating the interference status of the respective subband.

In some examples of the method, apparatuses, and non-transitory computer-readable medium described herein, receiving the indication of the interference status may include operations, features, means, or instructions for receiving an indication of a quantized value of an interference level.

In some examples of the method, apparatuses, and non-transitory computer-readable medium described herein, transmitting the control message may include operations, features, means, or instructions for transmitting an indication of a resource block group size, the one or more resources begin determined based on the indication of the resource block group size.

In some examples of the method, apparatuses, and non-transitory computer-readable medium described herein, the indication of the resource block group size specifies a default resource block group size.

In some examples of the method, apparatuses, and non-transitory computer-readable medium described herein, the indication of the resource block group size specifies a multiple of a default resource block group size.

In some examples of the method, apparatuses, and non-transitory computer-readable medium described herein, the indication of the resource block group size specifies a value for the resource block group size.

Some examples of the method, apparatuses, and non-transitory computer-readable medium described herein may further include operations, features, means, or instructions for determining a subband size based on the indication of the resource block group size.

In some examples of the method, apparatuses, and non-transitory computer-readable medium described herein, each the one or more resources corresponds to an instance a reference signal being transmitting using a different beam by the second base station.

Some examples of the method, apparatuses, and non-transitory computer-readable medium described herein may further include operations, features, means, or instructions for transmitting, to the second base station, an indication of the interference status corresponding to the UE.

Some examples of the method, apparatuses, and non-transitory computer-readable medium described herein may further include operations, features, means, or instructions for updating a table with an indication of the one or more resources, a cell associated with the second base station, a beam identifier of the beam, a beam corresponding to the first base station, the indication of the interference status, or a combination thereof.

Some examples of the method, apparatuses, and non-transitory computer-readable medium described herein may further include operations, features, means, or instructions for receiving, from the second base station, an indication of the beam, the one or more resources, or a combination thereof.

DETAILED DESCRIPTION

Figure 1:
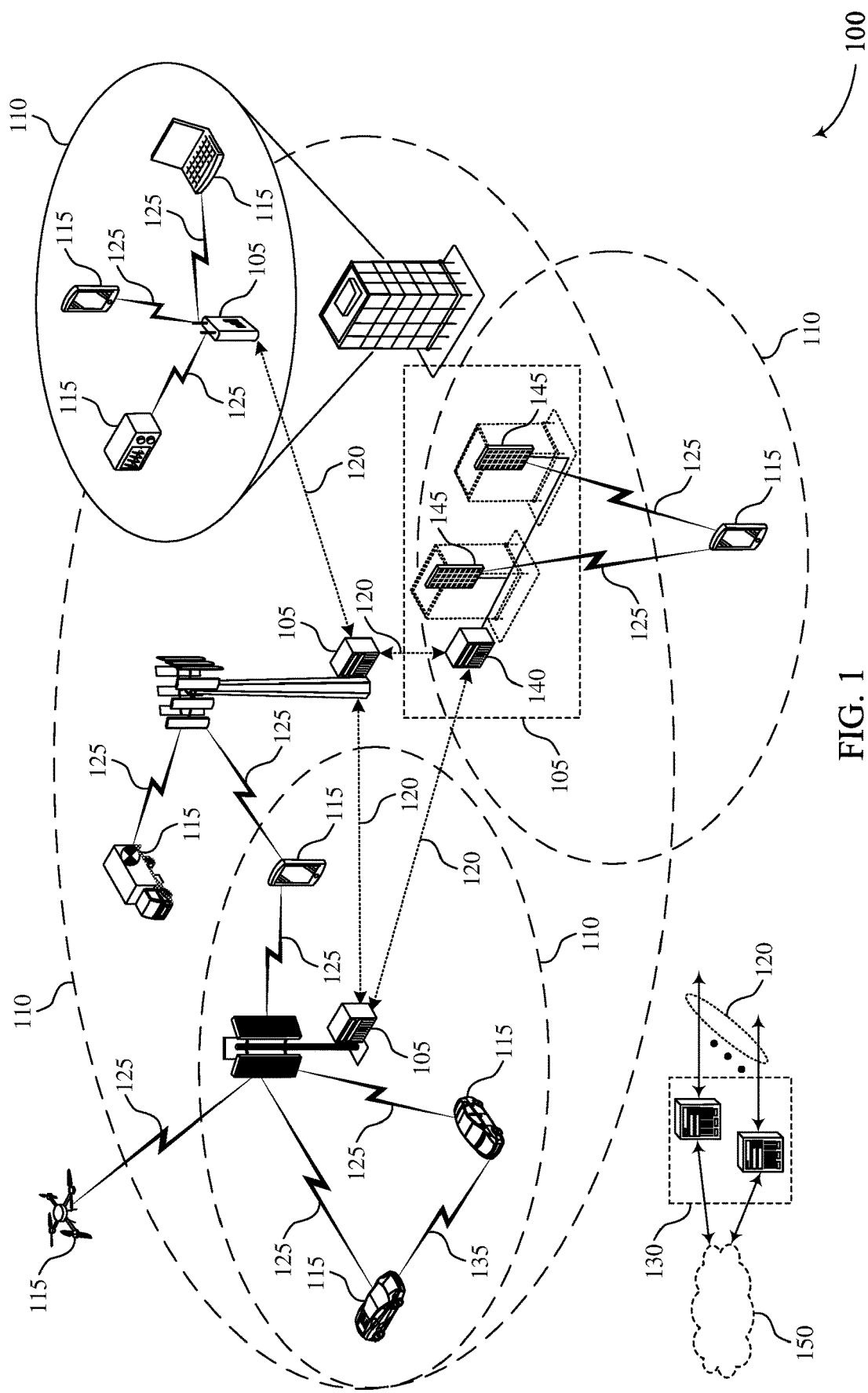
FIG. 1 illustrates an example of a system for wireless communications that supports reporting neighboring cell interference due to beam jamming in accordance with aspects of the present disclosure.

User equipments (UEs) may periodically transmit channel state information (CSI) reports to network base stations. These CSI reports may indicate a channel quality, which may depend on interference by other communications. To generate such reports, a UE may measure reference signals transmitted by a serving base station and report the measurements to the serving base station. Interference by neighboring cells or base stations may be implicitly reported to the serving base station using a channel quality indicator (CQI). The CQI represents a signal power and interference level. However, if a UE reports a bad CQI in relation to a neighboring cell, the CQI information may not convey any beam-related or spatial details. For example, in two neighboring cells, each with respective UEs that are relatively co-located such that the beams from the respective cells are directed toward both UEs, both UEs may suffer from strong interference from transmissions on the other beams. Currently, both UEs may report bad CQIs, but these reports may not specify a beam or direction that is causing the interference.

Implementations described herein support explicit reporting of beam jamming or inter-cell interference. More particularly, the techniques described herein may be used to identify beams and resources from neighboring cells that may interfere with each other. Neighboring cells may coordinate to determine resources to utilize for beam jamming evaluations. A UE may be configured to measure a reference signal transmitted by a neighboring base station. The reference signal may be a CSI-RS and may be transmitted by the neighboring base station or cell via a specific beam. The UE may be configured to measure multiple CSI-RSs, each transmitted on different beams. The victim UE may report a jamming status for each CSI-RS individually, or as a combined wideband report. If the beam jamming interference is above a threshold, the victim UE may report the presence of beam jamming above the threshold. Alternatively, multiple thresholds may be used and reported for each measured beam. Reports may also be for a configurable subband size. Thus, using the techniques described herein, networks may be able to identify which beams and resources may interfere with each other, which may support reduction of interference.

Particular aspects of the subject matter described herein may be implemented to realize one or more advantages. The described techniques may support improvements in the CSI reporting framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to wireless communications systems and process flow diagrams Aspects of the disclosure are further illustrated by and described with reference to apparatus diagrams, system diagrams, and flowcharts that relate to reporting neighboring cell interference due to beam jamming.

FIG. 1 illustrates an example of a wireless communications system 100 that supports reporting neighboring cell interference due to beam jamming in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As discussed herein, the wireless communications system 100 may support beamforming to increase signal reliability and efficiency, among other benefits. In some cases, two UEs 115 are positioned in respective neighboring cells and each UE 115 is relatively co-located such that the beams from the respective cells are directed toward both UEs 115. Accordingly, both UEs 115 may suffer from strong interference from transmissions on the other beams. However, current CSI reporting is configured for inter-cell interference, and may not include any beam-related or spatial details which may allow the network to identify which beams and resources associated with other base stations are causing interference.

Aspects of the disclosure described herein provide for techniques for explicit reporting of "beam-jamming" or inter-cell beam interference. Neighboring cells may coordinate to identify resources and beams to use for beam jamming evaluations. For example, a UE 115 may be configured to measure a reference signal transmitted by a neighboring base station 105 during resources associated with the base station 105 that is serving the UE 115. The reference signal may be a CSI-RS and may be transmitted using a specific beam or a plurality of beams. The UE 115 may report an interference status (e.g., jamming status) for each measured CSI-RS or as a combined report for multiple CSI-RS resources. Thus, the base stations 105 may identify which beams and resources (e.g., time and frequency resources) may be interfering with each other in respective cells. These and other implementations are further described with respect to the following figures.

Figure 2:
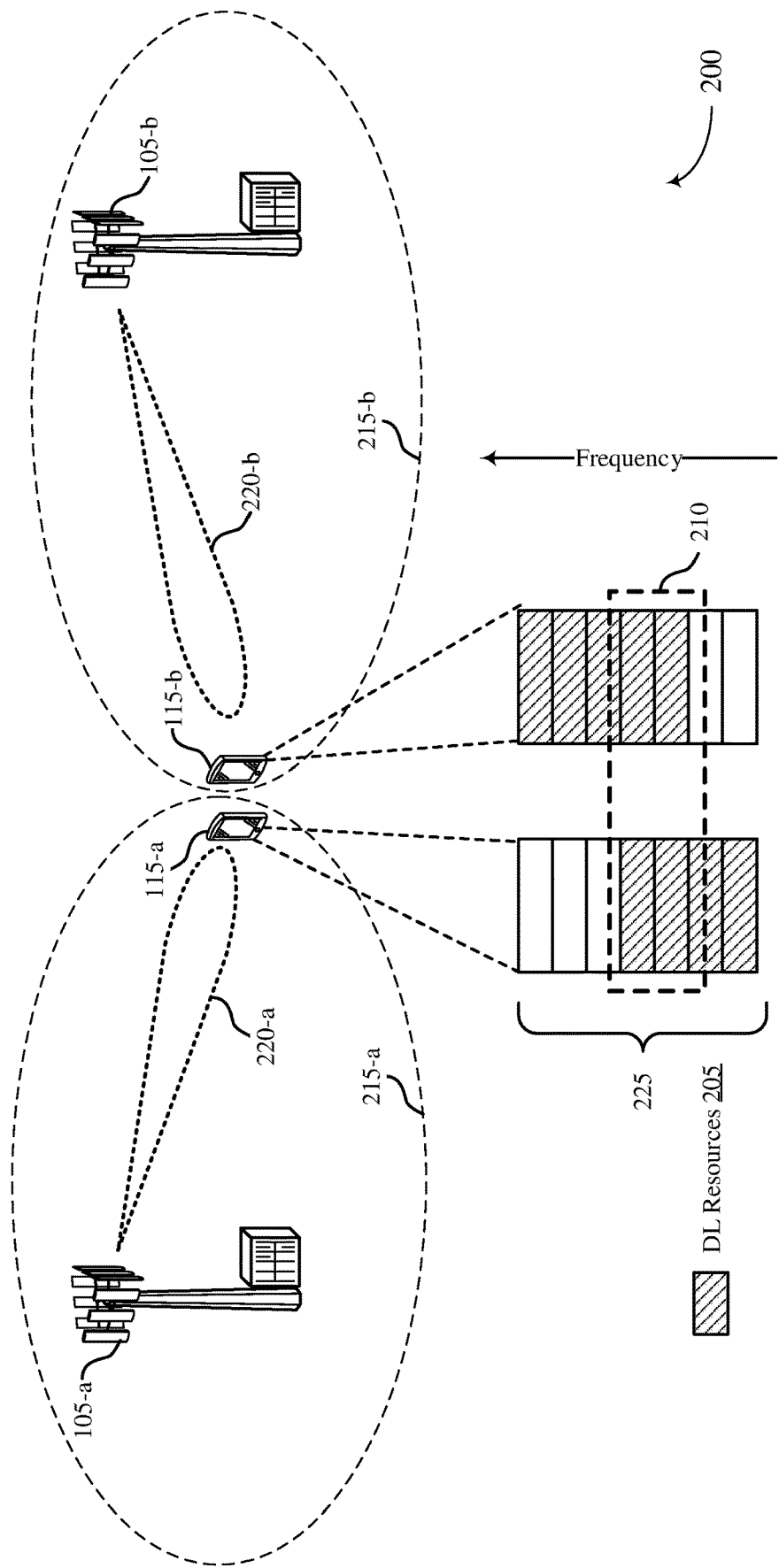
FIG. 2 illustrates an example of a wireless communications system that supports reporting neighboring cell interference due to beam jamming in accordance with aspects of the present disclosure.

FIG. 2 illustrates an example of a wireless communications system 200 that supports reporting neighboring cell interference due to beam jamming in accordance with aspects of the present disclosure. In some examples, wireless communications system 200 may implement aspects of wireless communications system 100. The wireless communications system includes base station 105-*a*, base station 105-*b*, UE 115-*a*, and UE 115-*b*, which may be examples of the base stations 105 and UEs 115 as described with respect to FIG. 1. Each base station 105 may support communication in one or more cells. For example, base station 105-*a* supports communication in cell 215-*a*, while base station 105-*b* supports communications in cell 215-*b*.

UE 115-*a* is positioned in cell 215-*a*, and UE 115-*b* is positioned in cell 215-*b*. However, UE 115-*a* and UE 115-*b* are co-located such that beams 220 that are utilized to communicate with respective UEs 115 may be pointed in the same or in overlapping directions. That is, the UE 115-*a* and UE 115-*b* are located in a manner that each of the respective beams 220 is pointed at both UEs 115-*a* and 115-*b*. For example, if UE 115-*a* receives a transmission from the base station 105-*a* on beam 220-*a* using respective downlink resources 205, and UE 115-*b* receives a transmission on beam 220-*b* from the base station 105-*b* using respective downlink resources 205, then the transmissions may interference with each other at overlapping resources 210.

Implementations described herein provide for techniques to identify the beams 220-*a* and 220-*b* and the overlapping resources 210. For example, base stations 105-*a* and 105-*b* may coordinate to identify the overlapping resources 210. Coordination may include configuring one or both UEs 115-*a* and 115-*b* to perform reference signal measurements (e.g., CQI measurements) on a reference signal, such as a CSI-RS. In one particular example, the base station 105-*a* configures the UE 115-*a* to perform measurements on CSI-RS transmitted by the base station 105-*b* using downlink resources 205. The UE 115-*a* may generate a report for each CSI-RS, each downlink resource 205, for the set of downlink resources 205, or for some other granularity (e.g., a subband or frequency band). In some cases, the UE 115-*a* may report the presence of beam jamming (e.g., 1 or 0, or valid or invalid) when detected interference (e.g., based on the measurements) is above a threshold. Alternatively, multiple thresholds may be used and report for each measured beam.

In FIG. 2, the base station 105-*b* may transmit a reference signal or a set of reference signals during each resource 225 using beam 220-*b* or a set of beams 220. For example, a different beam may be used to transmit on each different resource 225, and each resource 225 may be a subband. The UE 115-*a* may be configured to measure a reference signal or set of reference signals during each of the resources 225. The UE 115-*a* may generate a bitmap, where each value corresponds to a resource (e.g., subband) of the resources 225. In some cases, the value in the bitmap is set to 1 if the UE 115-*a* detects interference above a threshold, and the value in the bitmap is set to 0 if the UE 115-*a* detects interference below the threshold. If the UE 115-*a* detects interference above the threshold at overlapping resources 210, the UE 115-*a* may generate and transmit a bitmap with the values 0001100, for example. Accordingly, the base station 105-*a* may identify which beams and/or resources that may cause interference. The base station 105-*a* may share the information with base station 105-*b* by using a wired or wireless backhaul link for example.

Figure 3:
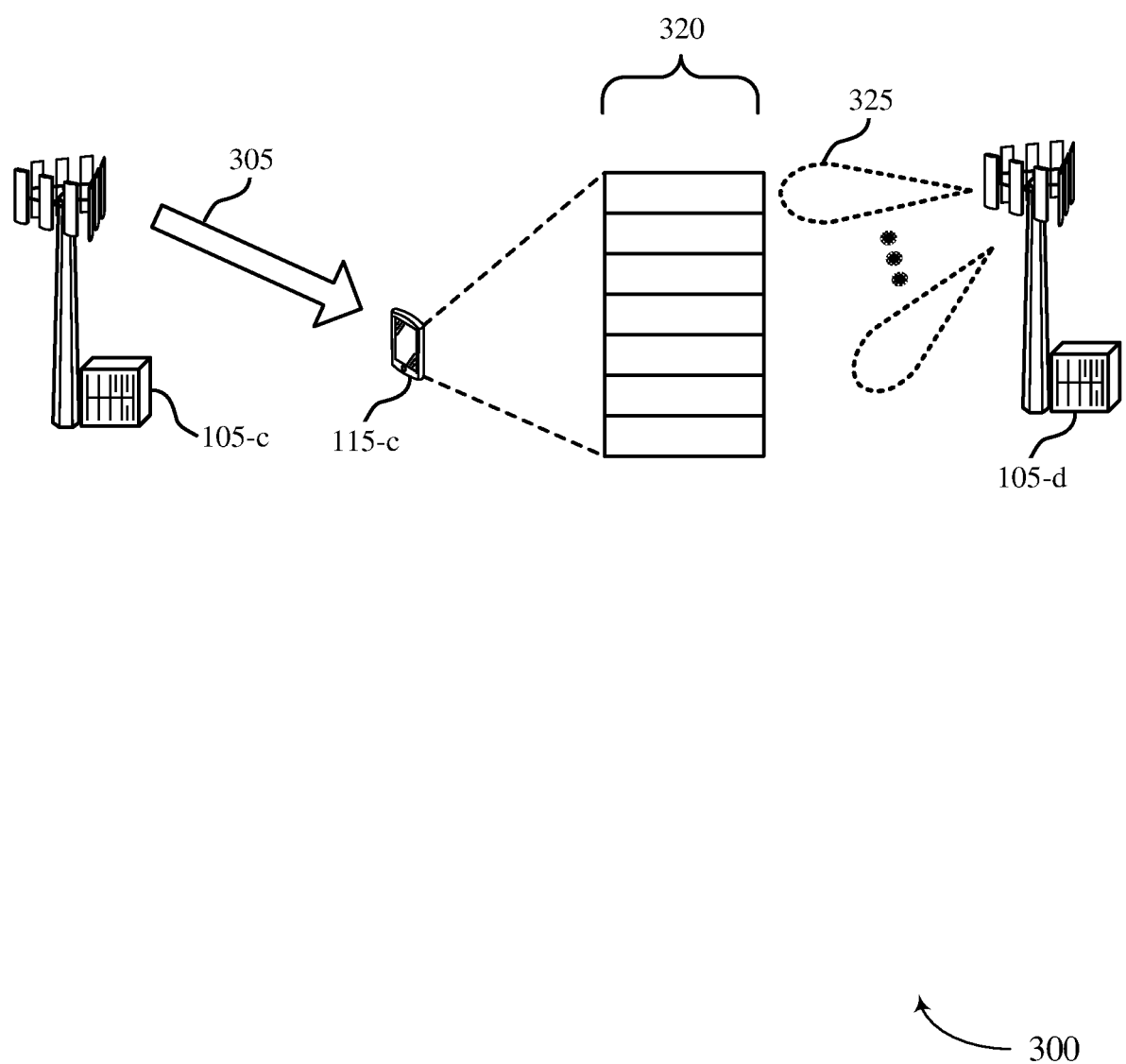
FIG. 3 illustrates an example of a wireless communications system that supports reporting neighboring cell interference due to beam jamming in accordance with aspects of the present disclosure.

FIG. 3 illustrates an example of a wireless communications system 300 that supports reporting neighboring cell interference due to beam jamming in accordance with aspects of the present disclosure. In some examples, wireless communications system 300 may implement aspects of wireless communications system 100. The wireless communications system 300 includes a base station 105-*c*, a base station 105-*d*, and UE 115-*c*, which may be examples of the corresponding devices as described with respect to FIGS. 1 and 2. The base stations 105-*c* and 105-*d* may support neighboring cells and UEs 115 positioned at the each of a cell may receive interference from the other cell. UE 115-*c* may be positioned in the cell supported by base station 105-*c*. The base station 105-*c* and the base station 105-*d* may coordinate to determine beam jamming statuses corresponding to the respective cells.

To support determining the beam jamming status, UE 115-*c* may transmit a control message 305 to UE 115-*c*. The control message may include an indication to perform a measurement during one or more resources 320 that correspond to a beam 325 of the base station 105-*d*. The control message 305 may include various configuration parameters for performing the measurements. In one example, the UE 115-*c* is configured with a parameter (e.g., CSI-ReportConfig) with a parameter that indicates that the UE 115-*c* is expected to report the corresponding jamming status for each CSI-RS resource (CRI), of which each resource may correspond to a port/beam assumption of the neighboring cell. For example, the CSI-ReportConfig parameter may be have a higher layer parameter reportQuantity set to "cri-Jamming" or some other parameter that indicates that the UE 115-*c* is to report the jamming status for each CSI-RS resources. If configured with such a parameter, the UE 115-*c* may measure each CSI-RS resource (e.g., resources 320) and report the status for each measurement. The status may indicate whether the measurement indicates that the corresponding beam is jamming or may indicate a metric, such as a measurement metric for each CSI-RS resource.

In another example, the UE 115-*c* may be configured (e.g., via control message 305) with a higher layer parameter that indicates that the UE 115-*c* is expected to report the overall jamming status based on a measurement across multiple CSI-RS resources. For example, the CSI-ReportConfig parameter may be have a higher layer parameter reportQuantity set to "overall-Jamming" or some other parameter that indicates that the UE 115-*c* is to report the jamming status across CSI-RS resources. In such cases, the UE 115-*c* may utilize multiple measurements across the CSI-RS resources (e.g., resources 320) to determine a jamming status.

In some cases, the jamming report may be applied to zero power CSI-IM resources More particularly, the UE 115-*c* may be configured to perform the measurement on resources 320 in which the UE 115-*d* is not transmitting (or transmitting with zero power). As such, the CSI-IM resources are zero-power transmission resources of the UE 115-*c* and the serving cell corresponding the base station 105-*c*. As such, the UE 115-*c* may measure the interference power from the adjacent cell of the base station 105-*d* without transmissions from the base station 105-*c* interrupting or interfering.

In some examples, the UE 115-*c* may be additionally or alternatively be configured with a field of power detection threshold that may be applied to the measurements. For example, a higher layer parameter in CSI-ReportConfig may include a parameter JAM-Thresh that indicates the threshold that is to be used to evaluate the measurements of the CSI-RS. If the detected interference power on CSI-IM resources is above the configured threshold, then the UE 115-*c* may report a valid (e.g., 1) beam jamming status for the corresponding resources (e.g., one of the resources 320).

Further, the UE 115-*c* may be configured with a parameter that indicates a frequency granularity of the CSI jamming status report. For example, the CSI-ReportConfig may include a parameter (e.g., JAM-FormatIndicatorField) that may be set to a granularity such as wideband (e.g., widebandJAM) or a subband (e.g., subbandJAM). If the UE 115-*c* is configured with an indication to perform a wideband report, the UE 115-*c* may generate a report based on the measurements, where the report indicates a jamming status over a wideband or a frequency band that includes a set of subbands. If the UE 115-*c* is configured with an indication to perform a subband report, the UE 115-*c* may generate a report based on the measurements, where the report indicates a jamming status for each subband.

In one particular example, the UE 115-*c* is configured with to report a wideband jamming status. That is, the UE 115-*c* is configured with a CSI-ReportConfig with JAM-FormatIndicator set to widebandJAM. In a first option, the UE 115-*c* may include 1 bit to indicate whether the wideband reception (e.g., the set of resources 320) is identified as beam jamming as follows:

| widebandJam | Jamming Report |
|---|---|
| Reception with jamming | 1 |
| Reception without jamming | 0 |

In accordance with another option for wideband jamming reporting, the UE 115-c may indicate a quantization of the feedback. For example, the UE 115-c may indicate a 2 or 3 bit quantization to feedback the wideband interference level due to beam jamming. Thus, a range of detected interference may be portioned such that detected interference maps to one of the report values as follows:

| widebandJam | Jamming Report |
|---|---|
| Interference Power Level 0 | 00 |
| Interference Power Level 1 | 01 |
| Interference Power Level 2 | 10 |
| Interference Power Level 3 | 11 |

If the UE 115-c is configured to generate a wideband jamming report and the UE 115-c is configured to report an overall jamming status (e.g., across all CSI-RS resources), then the UE 115-c may report as illustrated as above (e.g., using one bit or a quantized report). If the UE 115-c is configured to generate the wideband jamming report and the UE 115-c is configured to report per CSI-RS resource, then the UE may report the jamming status for each resource as illustrated above (e.g., using one bit per CSI-RS resource) or using a quantized report per CSI-RS resource.

In another example, the UE 115-c is configured to report the interference per subband (e.g., JAM-FormatIndicator is set to subbandJam). According to this configuration, the UE 115-c is expected to report per-subband beam jamming status based on CSI-IM measurements. According to one option, the reporting format may include a bitmap, where each value of the bitmap indicates whether a correspond subband is suffering from beam jamming. For example, if each resource of the set of resources 320 corresponds to a subband, then the UE 115-c may report bitmap such as 0001100, where the is indicate that the UE 115-c measured interference. In some cases, a value indicates interference when the detected interference above a threshold. In another option, the UE 115-c may report a quantization of the detected interference per subband. For example, as described above, 2 or 3 bits may be used to indicate a quantized value of the interference per subband.

If the UE 115-c is also configured (e.g., in addition to per subband reporting) to perform an overall jamming report (e.g., across multiple CSI-RS resources), then the UE may report the jamming status per subband using a bitmap or using a quantized value. If the UE 115-c is also configured to report per resource in addition to the per subband reporting, then the UE 115-c may be expected to report the jamming status for each CSI-RS resource per subband or quantized value per CSI-RS resource per subband.

In some cases, the UE 115-c may be configured with a frequency resource block group size for reporting the jamming status. For example, the UE 115-c may be configured (e.g., via control message 305) with a flag (e.g., jmbg-ReuseConfigSubbandSize) to indicate if the jamming report resource block group size is a same as a configurable subband size in reporting configuration for CSI. If the flag is set to true, then the UE 115-c may be configured via higher layer signaling with one of two resource block group sizes, wherein a resource block group size is equal to a subband size defined as $N_{PRB}^{SB}$ contiguous PRBs and depends on the total number of PRBs in the bandwidth part (BWP). If the flag is set to false, then the jamming report resource block group size for the UE 115-c may be defined by a higher layer parameter (e.g., jmbg-Size) that may be configured by CSI-ResourceConfig for example, That is, the parameter may explicitly indicate a size. In some examples, to reduce feedback overhead, the higher layer configured beam jamming report granularity (e.g., jmbg-Size) may be a multiplier of the CSI report configuration subband size. Thus, the indication of the resource block group size for the beam jamming report may be set to x times the CSI report configuration subband size. These assumptions may be applied to both frequency domain duplexed and time domain duplexed resources. Accordingly, using these indications in the control message 305, the UE 115-c may derive a subband size for beam jamming reporting based on the configured resource block group size.

As discussed herein, base stations 105 may coordinate to perform interference reporting and share the results. For example, after receiving the indication of the interference status from UE 115-c (e.g., a CSI-Report), the base station 105-c may communicate the results to base station 105-d. Similarly, base station 105-d may communicate any beam jamming results to the base station 105-c. This may benefit a wireless communications system 300 by supporting interference mitigation between the base stations 105-c and 105-d. The base stations 105 may formulate a jamming graph or table containing a jamming pair (e.g., a pair of beams that may interference with one another). Thus, the base stations 105 may coordinate with neighboring cells to support efficient resource allocation and beam adoption. Further, the bases stations 105 may be able to determine spatial information related to cell coverage overlapping. That is, the jamming reports may be utilized to derive a jamming path or direction. The jamming direction may be combined to determine the coverage range and potential interference area/direction to neighboring cells. For example, a base station may use Table 1 or Table 2 below to maintain beam jamming information. These tables may maintain different levels of granularity (e.g., resource and cell pairs or resource and beam pairs).

TABLE 1

| Resource ID for Cell A (Frequency or Time Domain) | Jamming Cell/Beam List |
|---|---|
| 1 | Cell B Or Cell B & Beam P |
| 2 | Cell C Or Cell C & Beam Q |

TABLE 2

| Jamming Pair | Cell/Beam/ Resource Cat 1 | Cell/Beam/ Resource Cat 2 |
|---|---|---|
| Jamming Pair #1 | Cell A & Beam P_1 & Freq/time resource L | Cell B & Beam Q_1 & Freq/time resource L |
| Jamming Pair #2 | Cell A & Beam P_2 & Freq/time resource M | Cell B & Beam Q_2 & Freq/time resource M |

Figure 4:
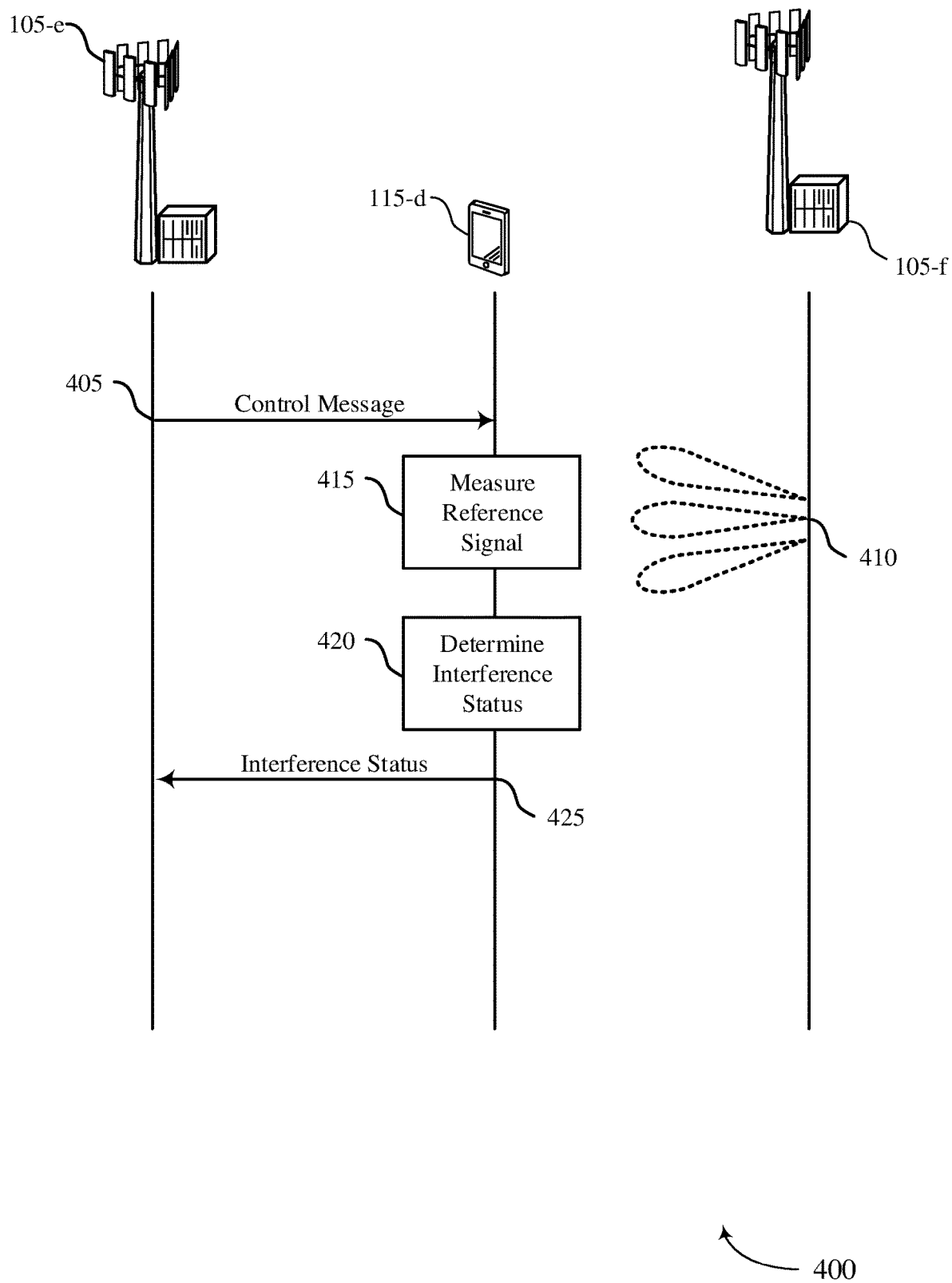
FIG. 4 illustrates an example of a process flow diagram that supports reporting neighboring cell interference due to beam jamming in accordance with aspects of the present disclosure.

FIG. 4 illustrates an example of a process flow diagram 400 that supports reporting neighboring cell interference due to beam jamming in accordance with aspects of the present disclosure. In some examples, process flow diagram 400 may implement aspects of wireless communications system 100. The process flow diagram includes a base station 105-f and a UE 115-d, which may be examples of the corresponding devices as described with respect to FIGS. 1 through 3. The base station 105-e and 105-f may coordinate to determine beam jamming status for various beams and/or resources. Each of the base stations 105-e and 105-f may support one or more communication cells. The UE 115-d may be positioned in a cell of the base station 105-e.

At 405, the UE 115-d may receive, from the base station 105-e (a first base station) a control message that includes an indication to perform a measurement during one or more resources of the first base station 105-e that correspond to a beam of the second base station 105-f. The one or more resources may be time and frequency resources and may correspond to CSI-RS resources, subbands, frequency bands, resource blocks, etc. In some cases, the control message may indicate that the UE 115-d is to report per CSI-RS resource, across a set of CSI-RS resources, for a wideband (e.g., frequency) or per subband of a frequency band.

At 410, the UE 115-d may transmit a set of CSI-RS using the resources. In some cases, the UE 115-f transmits on a different beam per resource (e.g., per subband) such that the measurements or reports may be mapped to particular beams. In other cases, the UE 115-f may use the same beam per resource. At 415, the UE 115-d may measure, based at least in part on receiving the control message, a reference signal transmitted via the beam of the second base station 105-f and during the one or more resources.

At 420, the UE 115-d may determine an interference status that corresponds to the one or more resources of the first base station and the beam of the second base station based at least in part on measurements of the reference signal. The interference status may include whether an interference measurement is above a particular threshold, which may be configured by the control message. In some examples, determining the interference status may also include determining a quantized metric of interference. The interference status may be determined for each CSI-RS resource, for a set of CSI-RS resources, for each subband of a set of subbands, for a frequency band, or some combination thereof, based on the configuration.

At 425, the UE 115-d may transmit, to the first base station UE 115-e, an indication of the interference status associated with and the one or more resources and the beam of the second base station. The indication of the interference status may be in the form of a CSI report.

Figure 5:
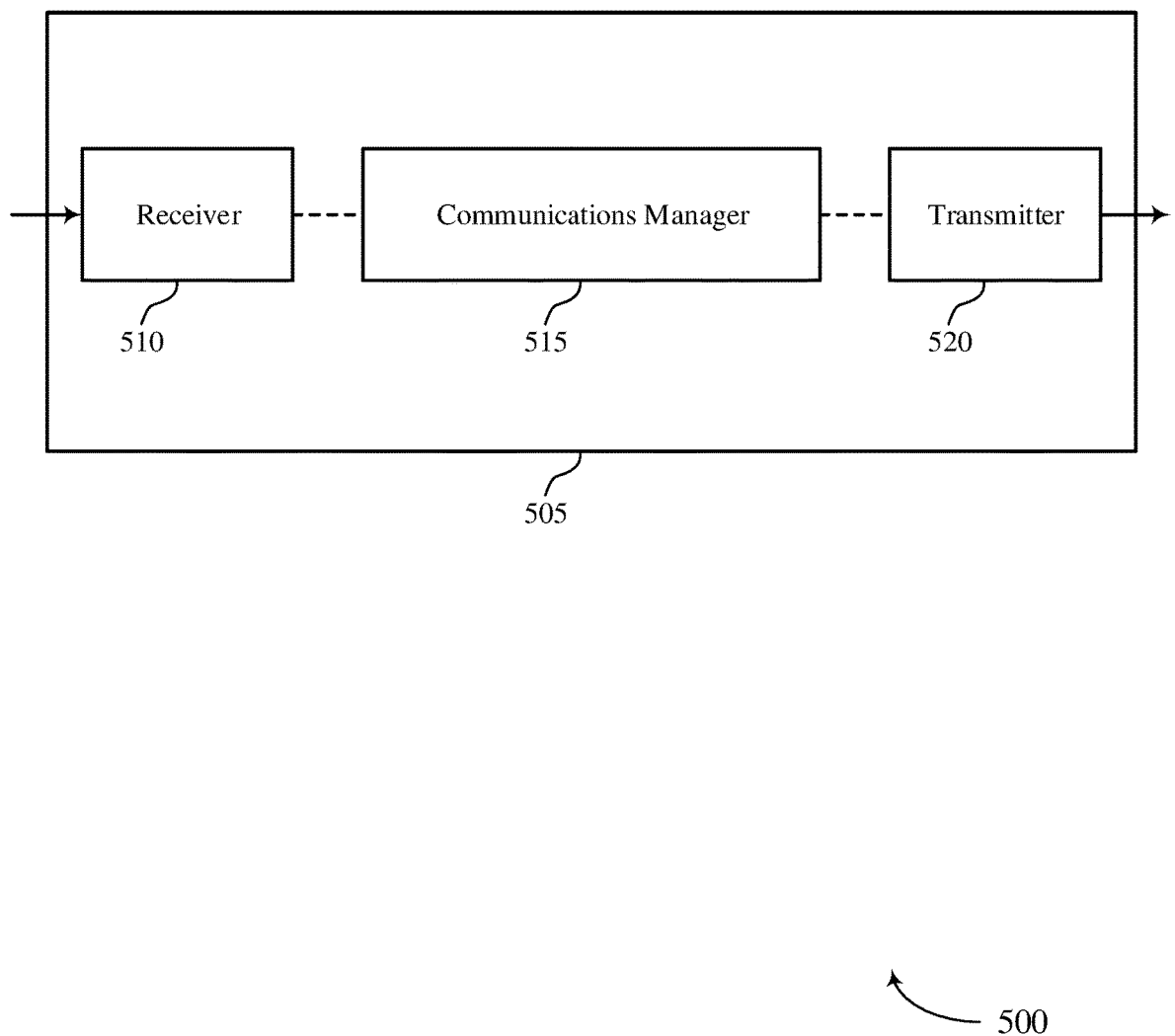
FIGS. 5 and 6 show block diagrams of devices that support reporting neighboring cell interference due to beam jamming in accordance with aspects of the present disclosure.

FIG. 5 shows a block diagram 500 of a device 505 that supports reporting neighboring cell interference due to beam jamming in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reporting neighboring cell interference due to beam jamming, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a first base station serving the UE, a control message that includes an indication to perform a measurement during one or more resources of the first base station that correspond to a beam of a second base station, the one or more resources of the first base station being time and frequency resource, measure, based on receiving the control message, a reference signal transmitted via the beam of the second base station and during the one or more resources, determine an interference status that corresponds to the one or more resources of the first base station and the beam of the second base station based on measurements of the reference signal, and transmit, to the first base station, an indication of the interference status associated with and the one or more resources and the beam of the second base station. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently determine interference between neighboring cells, and more specifically identify beams and/or resources that cause interference. For example, the device 505 may receive a control message that indicates resources to measure a reference signal and determine interference statuses based on the measurements of the reference signals.

Based on implementing the interference status reporting techniques as described herein, a processor of a UE 115 (e.g., controlling the receiver 510, the transmitter 520, or the transceiver 820 as described with reference to FIG. 8) may increase reliability and decrease signaling overhead in communication by identifying resources and beams that may cause interference.

Figure 6:
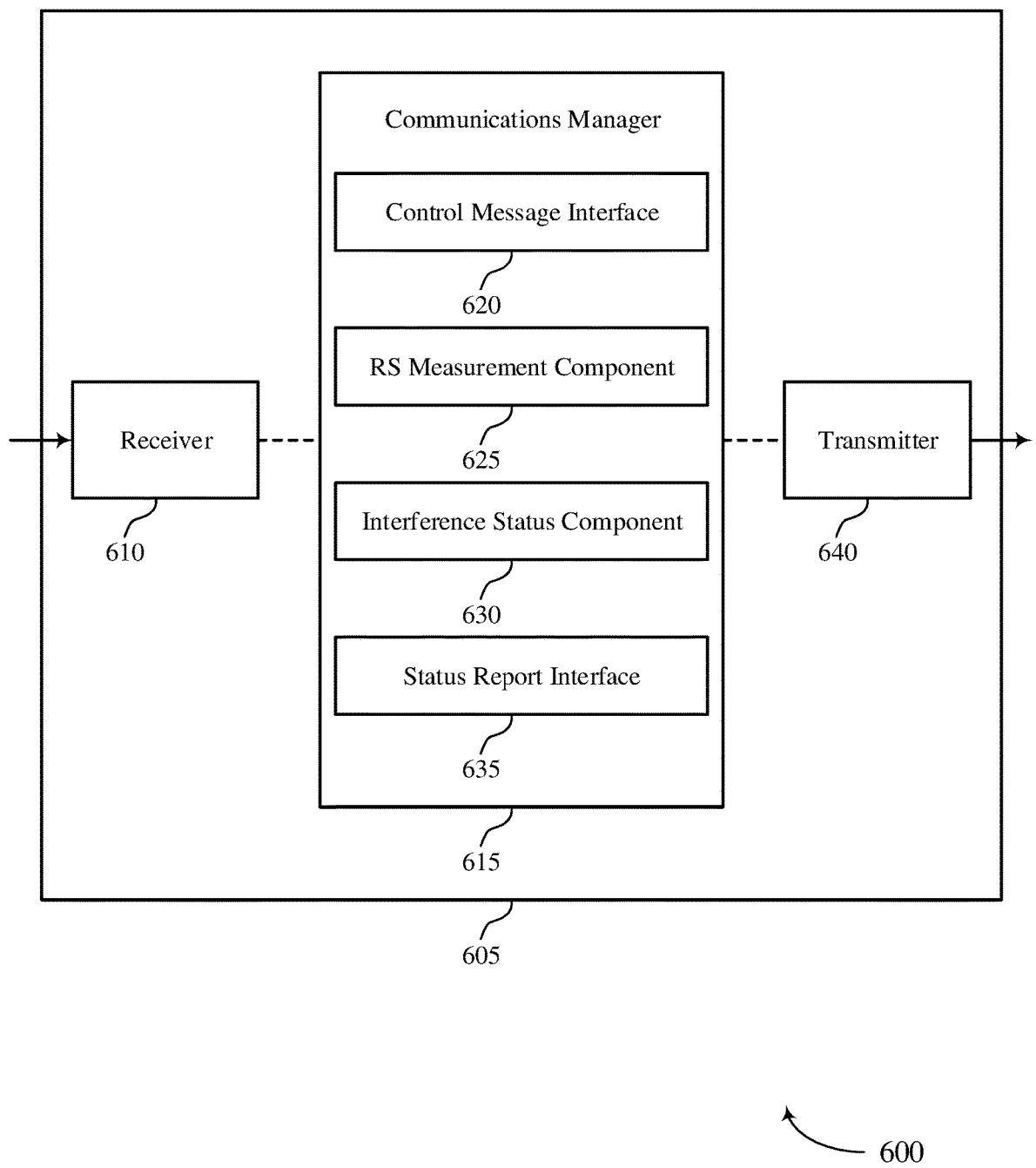

FIG. 6 shows a block diagram 600 of a device 605 that supports reporting neighboring cell interference due to beam jamming in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to reporting neighboring cell interference due to beam jamming, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control message interface 620, a reference signal (RS) measurement component 625, an interference status component 630, and a status report interface 635. The communications manager 615 may be an example of aspects of the communications manager 810 described herein.

The control message interface 620 may receive, from a first base station serving the UE, a control message that includes an indication to perform a measurement during one or more resources of the first base station that correspond to a beam of a second base station, the one or more resources of the first base station being time and frequency resource.

The RS measurement component 625 may measure, based on receiving the control message, a reference signal transmitted via the beam of the second base station and during the one or more resources.

The interference status component 630 may determine an interference status that corresponds to the one or more resources of the first base station and the beam of the second base station based on measurements of the reference signal.

The status report interface 635 may transmit, to the first base station, an indication of the interference status associated with and the one or more resources and the beam of the second base station.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
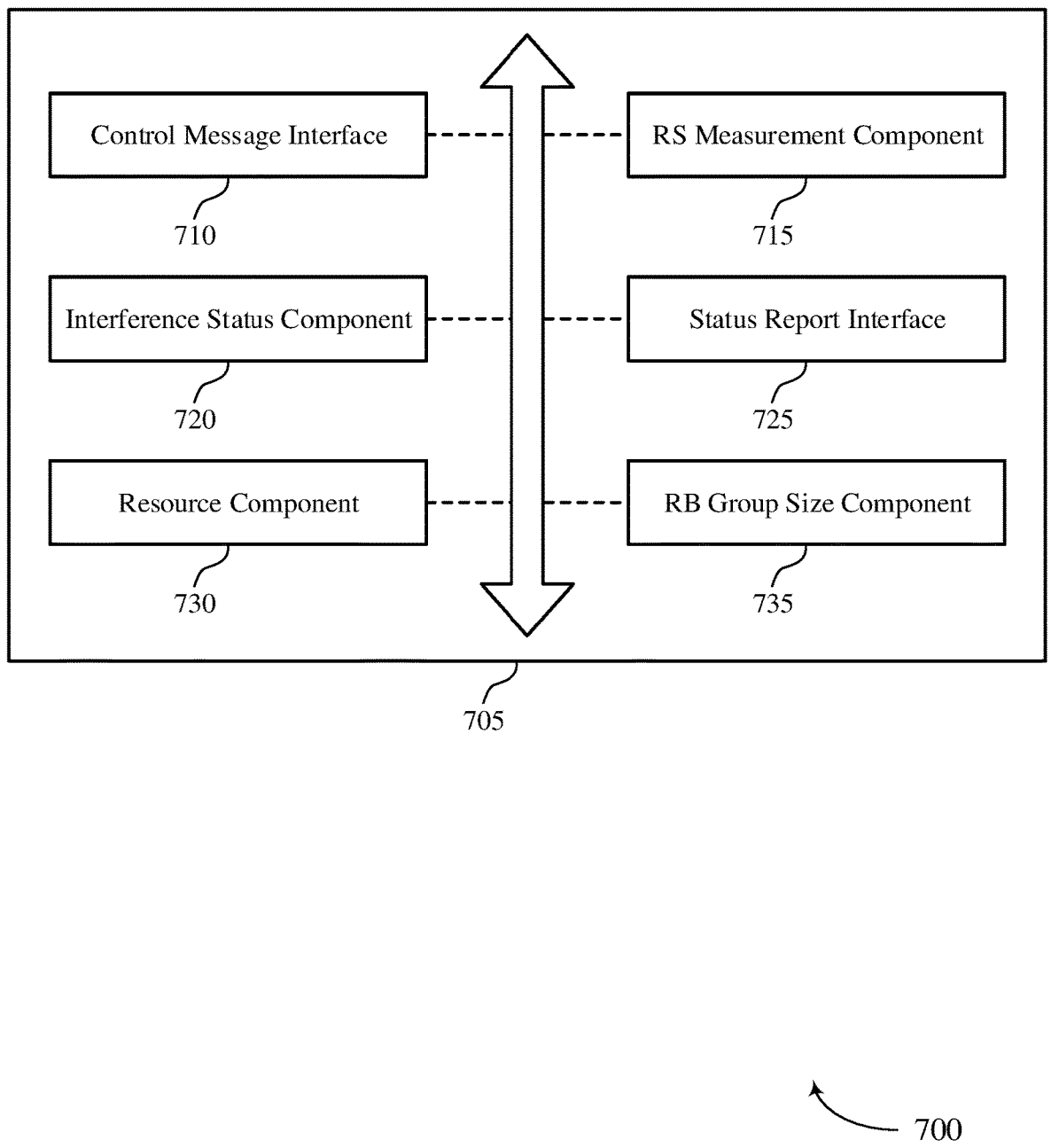
FIG. 7 shows a block diagram of a communications manager that supports reporting neighboring cell interference due to beam jamming in accordance with aspects of the present disclosure.

FIG. 7 shows a block diagram 700 of a communications manager 705 that supports reporting neighboring cell interference due to beam jamming in accordance with aspects of the present disclosure. The communications manager 705 may be an example of aspects of a communications manager 515, a communications manager 615, or a communications manager 810 described herein. The communications manager 705 may include a control message interface 710, a RS measurement component 715, an interference status component 720, a status report interface 725, a resource component 730, and a resource block (RB) group size component 735. Each of these modules may communicate, directly or indirectly, with one another (e.g., via one or more buses).

The control message interface 710 may receive, from a first base station serving the UE, a control message that includes an indication to perform a measurement during one or more resources of the first base station that correspond to a beam of a second base station, the one or more resources of the first base station being time and frequency resource.

In some examples, the control message interface 710 may receive the control message that includes an indication of a resource block group size, the one or more resources begin determined based on the indication of the resource block group size.

The RS measurement component 715 may measure, based on receiving the control message, a reference signal transmitted via the beam of the second base station and during the one or more resources.

The interference status component 720 may determine an interference status that corresponds to the one or more resources of the first base station and the beam of the second base station based on measurements of the reference signal.

In some examples, the interference status component 720 may determine the interference status corresponding to each resource of the one or more resources based on the measurements of the reference signal transmitted during each resource of the one or more resources in accordance with the indication, each resource of the one or more resources corresponding to a reference signal resource of the second base station.

In some examples, the interference status component 720 may determine the interference status for a combination of the one or more resources based on the measurements of the reference signal transmitting during each resource of the one or more resources in accordance with the indication, each resource of the one or more resources corresponding to a reference signal resource of the second base station.

In some examples, the interference status component 720 may compare a measured interference power corresponding to the reference signal to an interference power threshold, the interference status being determined based on the comparing.

In some examples, the interference status component 720 may determine the interference status for a frequency band including a set of subbands based on the measurements in accordance with the indication.

In some examples, the interference status component 720 may determine the interference status for each subband of a set of subbands based on the measurements in accordance with the indication.

In some examples, the interference status component 720 may transmit a bitmap, each value of the bitmap corresponding to a respective subband of the set of subbands and indicating the interference status of the respective subband.

In some examples, the interference status component 720 may determine a quantized value of an interference level based on the measurements, where the quantized value is transmitted to the first base station.

In some cases, the interference status is determined to be valid based on the measured interference power exceeding the threshold in accordance with the comparing.

In some cases, the interference status is determined to be invalid based on the measured interference power not exceeding the threshold in accordance with the comparing.

The status report interface 725 may transmit, to the first base station, an indication of the interference status associated with and the one or more resources and the beam of the second base station.

The resource component 730 may determine that the one or more resources correspond to zero-power transmission resources for the first base station and the UE.

In some examples, the resource component 730 may determine a subband size of a subband for the interference status based on the indication of the resource block group size.

In some cases, each the one or more resources corresponds to an instance the reference signal being transmitting using a different beam by the second base station.

The RB group size component 735 may determine the resource block group size based on a default resource block group size in accordance with the indication of the resource block group size.

In some examples, the RB group size component 735 may determine the resource block group size in accordance with a value specified by the indication of the resource block group size.

In some cases, the determined resource block size is a multiple of the default resource block group size in accordance with the indication of the resource block group size.

Figure 8:
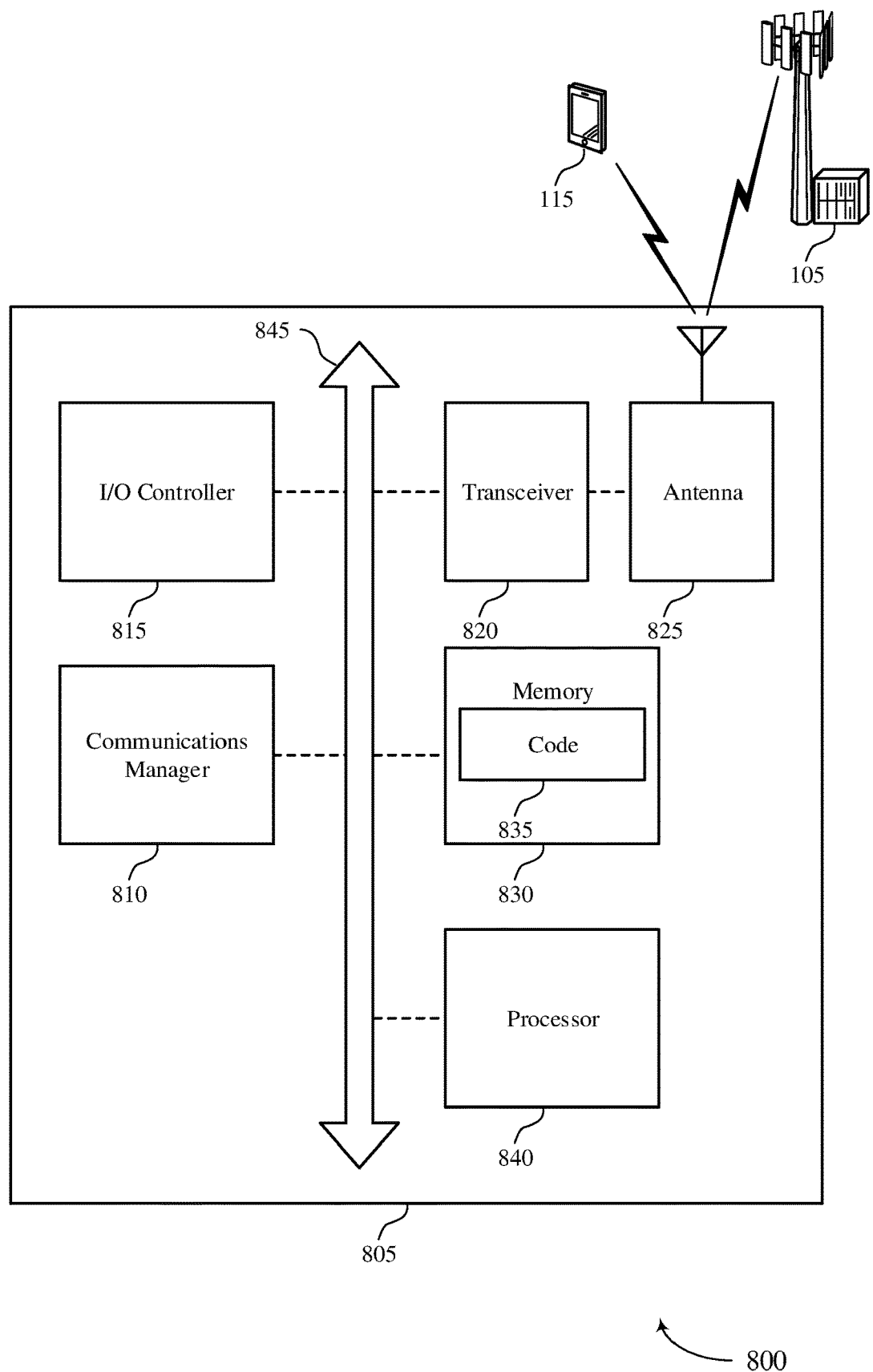
FIG. 8 shows a diagram of a system including a device that supports reporting neighboring cell interference due to beam jamming in accordance with aspects of the present disclosure.

FIG. 8 shows a diagram of a system 800 including a device 805 that supports reporting neighboring cell interference due to beam jamming in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a first base station serving the UE, a control message that includes an indication to perform a measurement during one or more resources of the first base station that correspond to a beam of a second base station, the one or more resources of the first base station being time and frequency resource, measure, based on receiving the control message, a reference signal transmitted via the beam of the second base station and during the one or more resources, determine an interference status that corresponds to the one or more resources of the first base station and the beam of the second base station based on measurements of the reference signal, and transmit, to the first base station, an indication of the interference status associated with and the one or more resources and the beam of the second base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reporting neighboring cell interference due to beam jamming).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
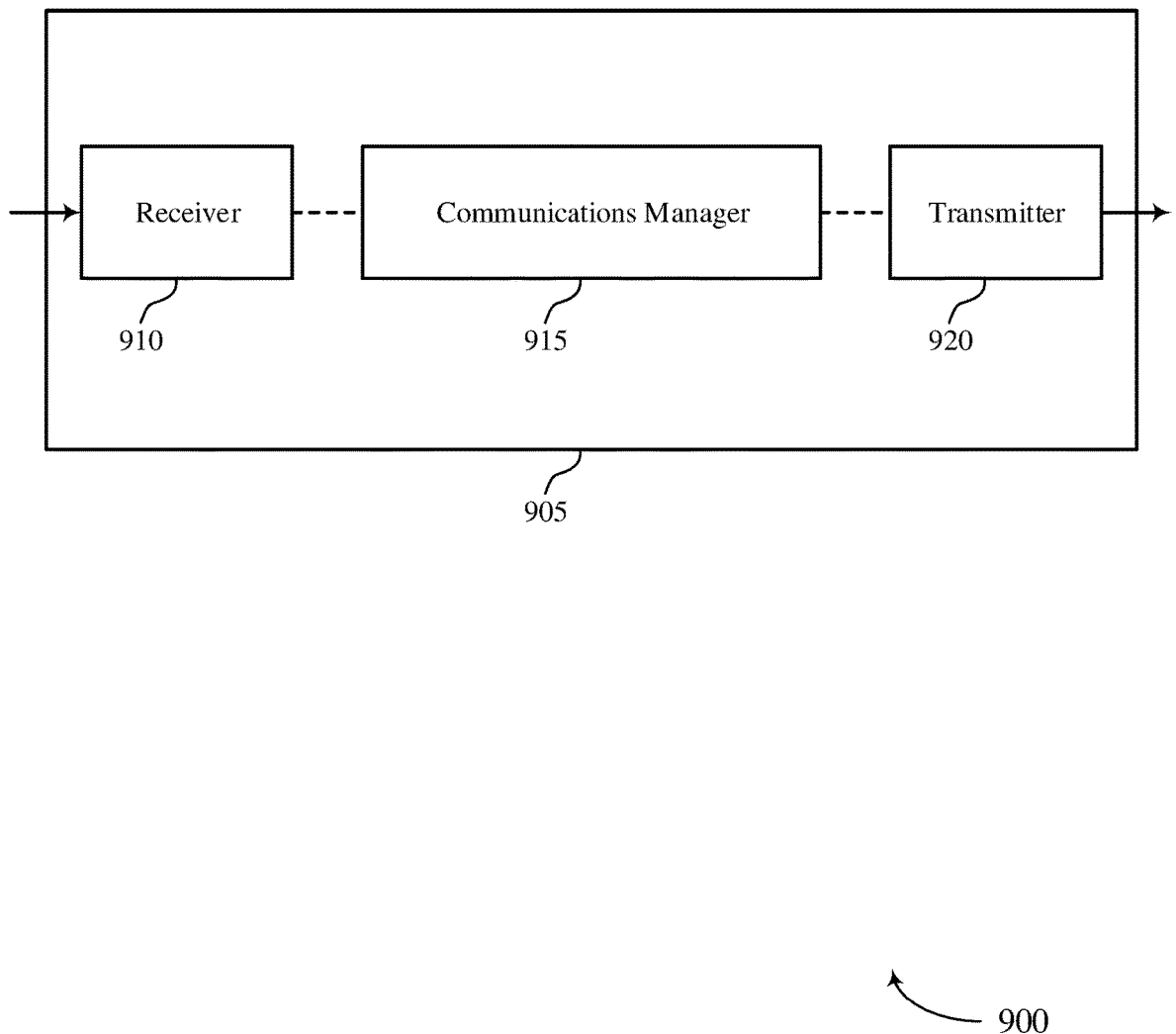
FIGS. 9 and 10 show block diagrams of devices that support reporting neighboring cell interference due to beam jamming in accordance with aspects of the present disclosure.

FIG. 9 shows a block diagram 900 of a device 905 that supports reporting neighboring cell interference due to beam jamming in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reporting neighboring cell interference due to beam jamming, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE served by the first base station, a control message that includes an indication to perform an interference measurement during one or more resources of the first base station that correspond to a beam of a second base station, the one or more resources of the first base station being time and frequency resources, receive, from the UE, an indication of an interference status associated with and the one or more resources of the first base station and the beam of the second base station, and communicate with the UE based on the indication of the interference status. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
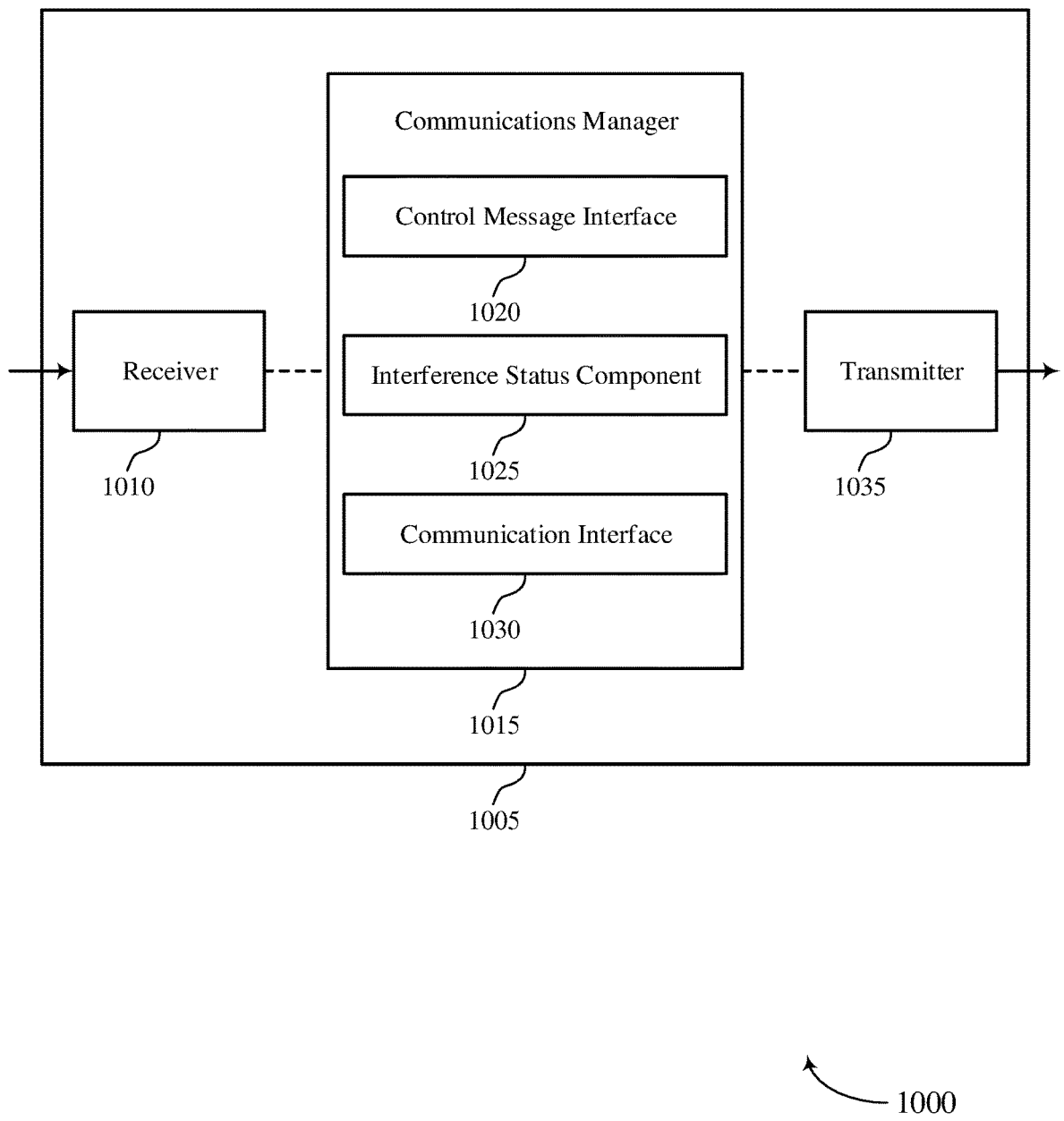

FIG. 10 shows a block diagram 1000 of a device 1005 that supports reporting neighboring cell interference due to beam jamming in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to reporting neighboring cell interference due to beam jamming, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a control message interface 1020, an interference status component 1025, and a communication interface 1030. The communications manager 1015 may be an example of aspects of the communications manager 1210 described herein.

The control message interface 1020 may transmit, to a UE served by the first base station, a control message that includes an indication to perform an interference measurement during one or more resources of the first base station that correspond to a beam of a second base station, the one or more resources of the first base station being time and frequency resources.

The interference status component 1025 may receive, from the UE, an indication of an interference status associated with and the one or more resources of the first base station and the beam of the second base station.

The communication interface 1030 may communicate with the UE based on the indication of the interference status.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
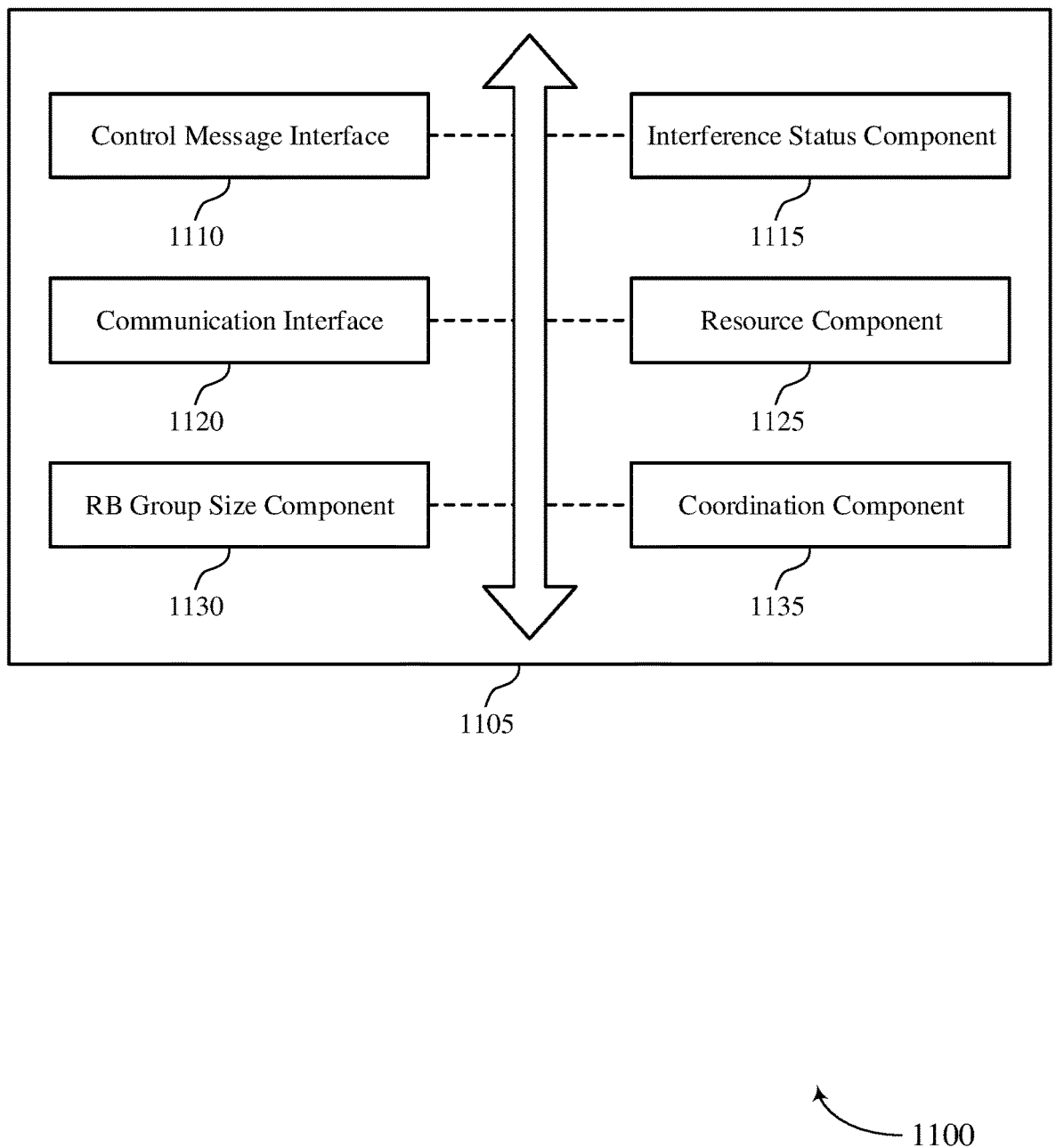
FIG. 11 shows a block diagram of a communications manager that supports reporting neighboring cell interference due to beam jamming in accordance with aspects of the present disclosure.

FIG. 11 shows a block diagram 1100 of a communications manager 1105 that supports reporting neighboring cell interference due to beam jamming in accordance with aspects of the present disclosure. The communications manager 1105 may be an example of aspects of a communications manager 915, a communications manager 1015, or a communications manager 1210 described herein. The communications manager 1105 may include a control message interface 1110, an interference status component 1115, a communication interface 1120, a resource component 1125, a RB group size component 1130, and a coordination component 1135. Each of these modules may communicate, directly or indirectly, with one another (e.g., via one or more buses).

The control message interface 1110 may transmit, to a UE served by the first base station, a control message that includes an indication to perform an interference measurement during one or more resources of the first base station that correspond to a beam of a second base station, the one or more resources of the first base station being time and frequency resources.

In some examples, the control message interface 1110 may include, within the control message, the indication to report the interference status corresponding to each resource of the one or more resources, each resource of the one or more resources corresponding to a reference signal resource of the second base station.

In some examples, the control message interface 1110 may include, within the control message, the indication to report the interference status corresponding to a combination of the one or more resources, each resource of the one or more resources corresponding to a reference signal resource of the second base station.

In some examples, the control message interface 1110 may include, within the control message, the indication to report the interference status based on comparing a measured interference power to an interference power threshold.

In some examples, the control message interface 1110 may include, within the control message, the indication to report the interference status for a frequency band including a set a subbands, where the indication of the interference status is received for the frequency band in accordance with the indication.

In some examples, the control message interface 1110 may include, within the control message, the indication to report the interference status for each subband of a set of subbands, where the indication of the interference status is received for each subband of the set of subbands in accordance with the indication.

The interference status component 1115 may receive, from the UE, an indication of an interference status associated with and the one or more resources of the first base station and the beam of the second base station.

In some examples, the interference status component 1115 may receive a bitmap, each value of the bitmap corresponding to a respective subband of a set of subbands and indicating the interference status of the respective subband.

In some examples, the interference status component 1115 may receive an indication of a quantized value of an interference level.

The communication interface 1120 may communicate with the UE based on the indication of the interference status.

The resource component 1125 may transmit an indication that each of the one or more resources corresponds to zero-power transmission resources for the first base station and the UE.

In some cases, each the one or more resources corresponds to an instance a reference signal being transmitting using a different beam by the second base station.

The RB group size component 1130 may transmit an indication of a resource block group size, the one or more resources begin determined based on the indication of the resource block group size.

In some examples, the RB group size component 1130 may determine a subband size based on the indication of the resource block group size.

In some cases, the indication of the resource block group size specifies a default resource block group size.

In some cases, the indication of the resource block group size specifies a multiple of a default resource block group size.

In some cases, the indication of the resource block group size specifies a value for the resource block group size.

The coordination component 1135 may transmit, to the second base station, an indication of the interference status corresponding to the UE.

In some examples, the coordination component 1135 may update a table with an indication of the one or more resources, a cell associated with the second base station, a beam identifier of the beam, a beam corresponding to the first base station, the indication of the interference status, or a combination thereof.

In some examples, the coordination component 1135 may receive, from the second base station, an indication of the beam, the one or more resources, or a combination thereof.

Figure 12:
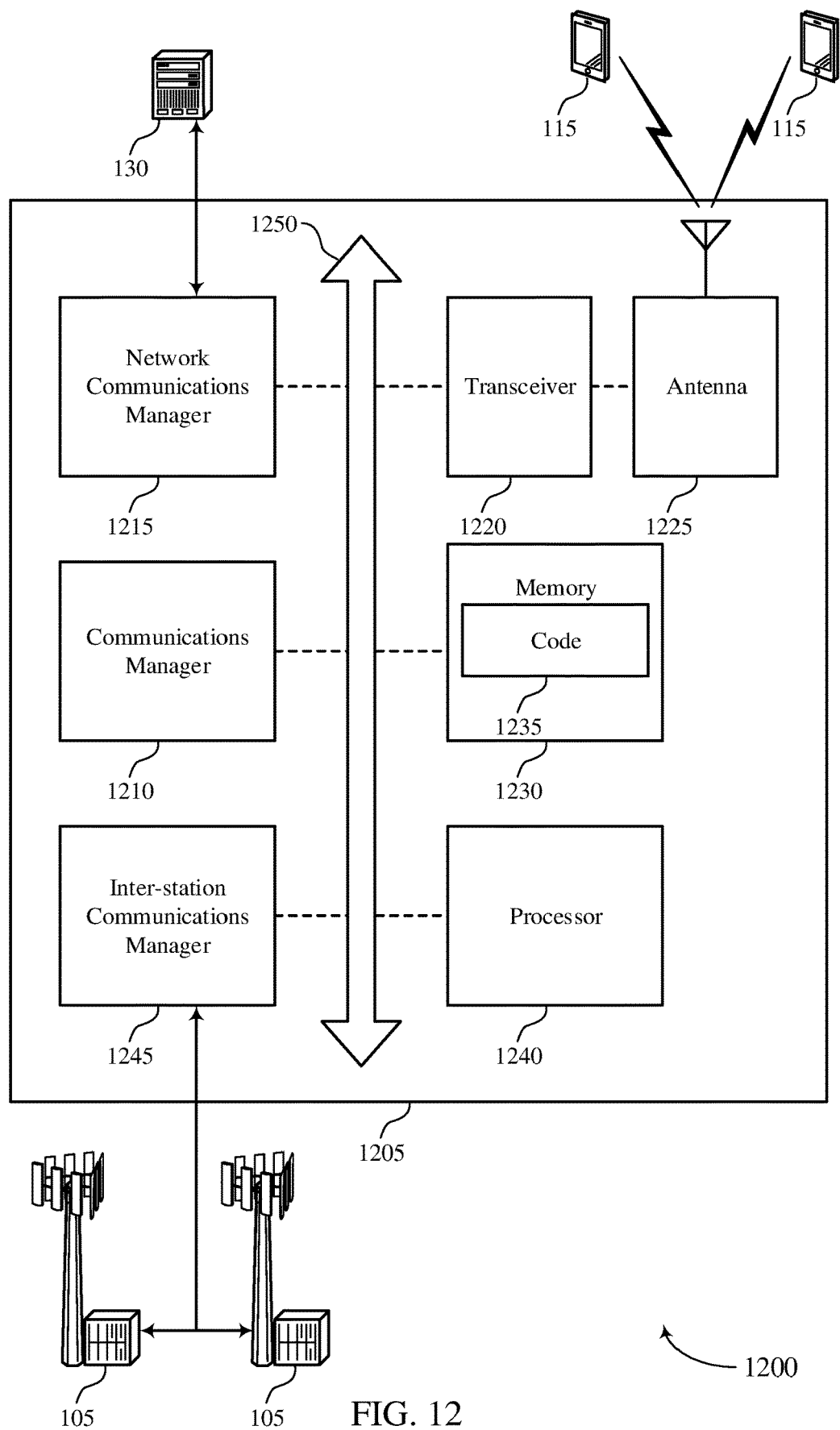
FIG. 12 shows a diagram of a system including a device that supports reporting neighboring cell interference due to beam jamming in accordance with aspects of the present disclosure.

FIG. 12 shows a diagram of a system 1200 including a device 1205 that supports reporting neighboring cell interference due to beam jamming in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE served by the first base station, a control message that includes an indication to perform an interference measurement during one or more resources of the first base station that correspond to a beam of a second base station, the one or more resources of the first base station being time and frequency resources, receive, from the UE, an indication of an interference status associated with and the one or more resources of the first base station and the beam of the second base station, and communicate with the UE based on the indication of the interference status.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reporting neighboring cell interference due to beam jamming).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
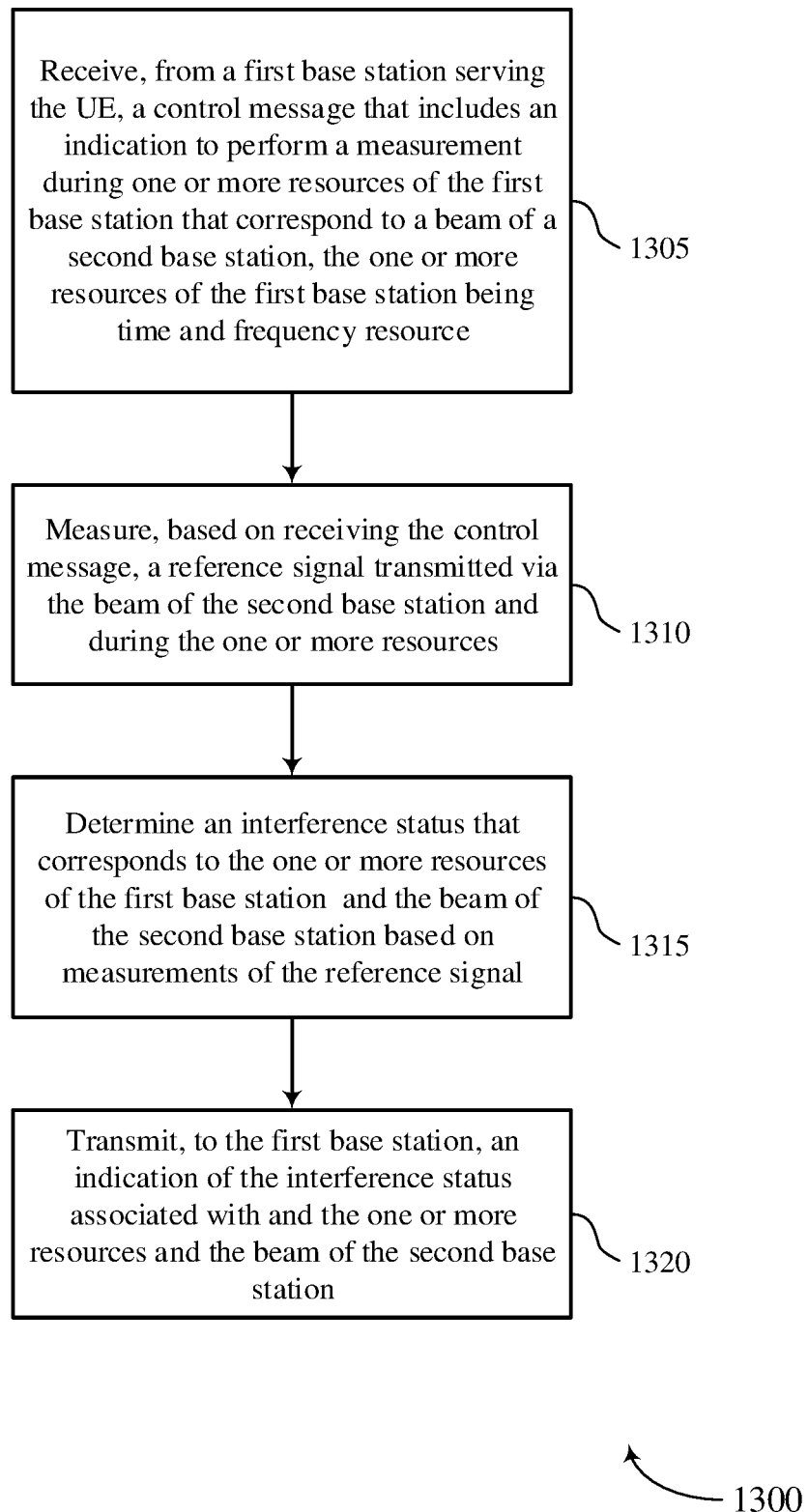
FIGS. 13 and 14 show flowcharts illustrating methods that support reporting neighboring cell interference due to beam jamming in accordance with aspects of the present disclosure.

FIG. 13 shows a flowchart illustrating a method 1300 that supports reporting neighboring cell interference due to beam jamming in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a first base station serving the UE, a control message that includes an indication to perform a measurement during one or more resources of the first base station that correspond to a beam of a second base station, the one or more resources of the first base station being time and frequency resource. The operations of 1305 may be performed according to the methods described herein. In some examples, aspects of the operations of 1305 may be performed by a control message interface as described with reference to FIGS. 5 through 8.

At 1310, the UE may measure, based on receiving the control message, a reference signal transmitted via the beam of the second base station and during the one or more resources. The operations of 1310 may be performed according to the methods described herein. In some examples, aspects of the operations of 1310 may be performed by a RS measurement component as described with reference to FIGS. 5 through 8.

At 1315, the UE may determine an interference status that corresponds to the one or more resources of the first base station and the beam of the second base station based on measurements of the reference signal. The operations of 1315 may be performed according to the methods described herein. In some examples, aspects of the operations of 1315 may be performed by an interference status component as described with reference to FIGS. 5 through 8.

At 1320, the UE may transmit, to the first base station, an indication of the interference status associated with and the one or more resources and the beam of the second base station. The operations of 1320 may be performed according to the methods described herein. In some examples, aspects of the operations of 1320 may be performed by a status report interface as described with reference to FIGS. 5 through 8.

Figure 14:
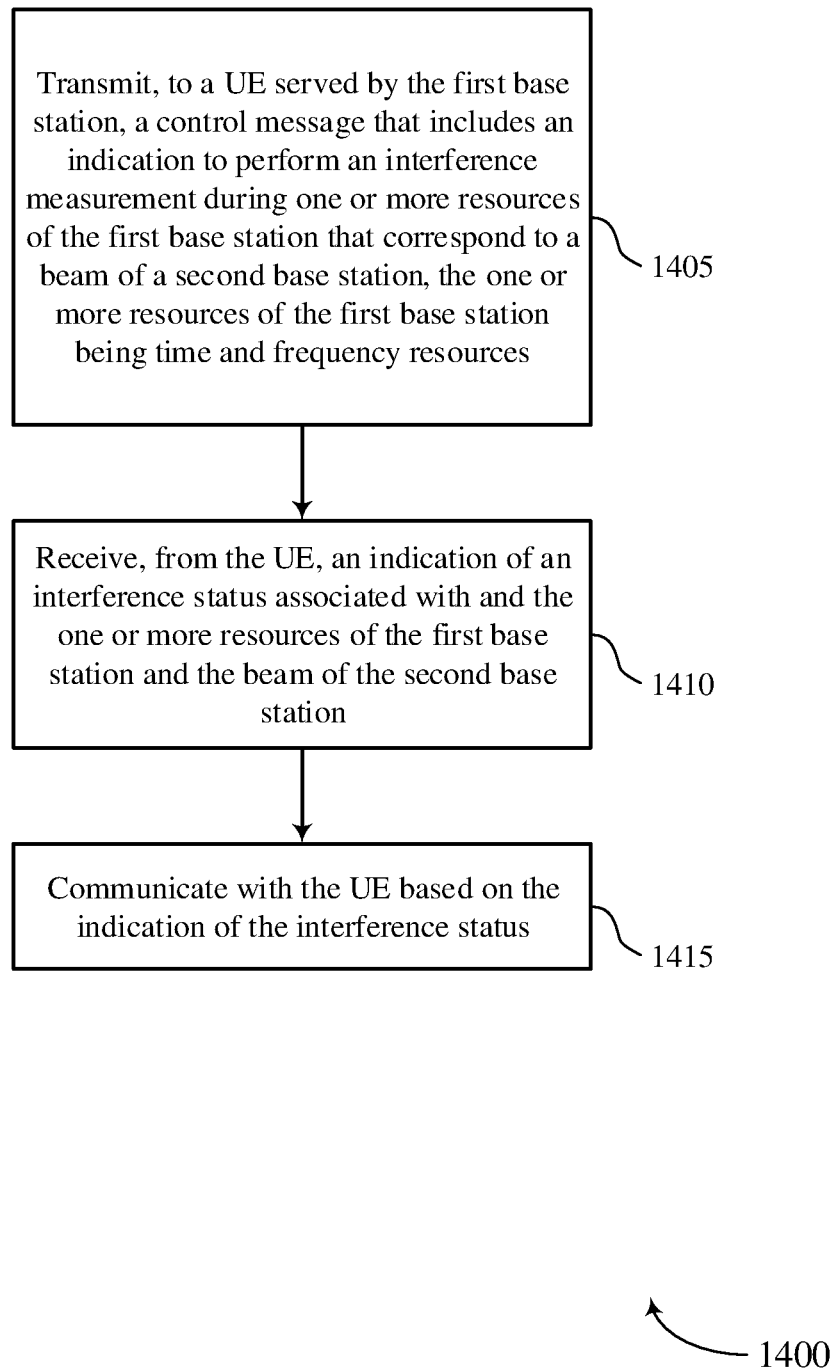

FIG. 14 shows a flowchart illustrating a method 1400 that supports reporting neighboring cell interference due to beam jamming in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit, to a UE served by the first base station, a control message that includes an indication to perform an interference measurement during one or more resources of the first base station that correspond to a beam of a second base station, the one or more resources of the first base station being time and frequency resources. The operations of 1405 may be performed according to the methods described herein. In some examples, aspects of the operations of 1405 may be performed by a control message interface as described with reference to FIGS. 9 through 12.

At 1410, the base station may receive, from the UE, an indication of an interference status associated with and the one or more resources of the first base station and the beam of the second base station. The operations of 1410 may be performed according to the methods described herein. In some examples, aspects of the operations of 1410 may be performed by an interference status component as described with reference to FIGS. 9 through 12.

At 1415, the base station may communicate with the UE based on the indication of the interference status. The operations of 1415 may be performed according to the methods described herein. In some examples, aspects of the operations of 1415 may be performed by a communication interface as described with reference to FIGS. 9 through 12.

The following provides an overview of examples of the present disclosure:

Example 1: A method for wireless communications at a user equipment (UE), comprising: receiving, from a first base station serving the UE, a control message that includes an indication to perform a measurement during one or more resources of the first base station that correspond to a beam of a second base station, the one or more resources of the first base station being time and frequency resource; measuring, based at least in part on receiving the control message, a reference signal transmitted via the beam of the second base station and during the one or more resources; determining an interference status that corresponds to the one or more resources of the first base station and the beam of the second base station based at least in part on measurements of the reference signal; and transmitting, to the first base station, an indication of the interference status associated with and the one or more resources and the beam of the second base station.

Example 2: The method of example 1, wherein determining the interference status comprises: determining the interference status corresponding to each resource of the one or more resources based at least in part on the measurements of the reference signal transmitted during each resource of the one or more resources in accordance with the indication, each resource of the one or more resources corresponding to a reference signal resource of the second base station.

Example 3: The method of any of examples 1 and 2, determining the interference status comprises: determining the interference status for a combination of the one or more resources based at least in part on the measurements of the reference signal transmitting during each resource of the one or more resources in accordance with the indication, each resource of the one or more resources corresponding to a reference signal resource of the second base station.

Example 4: The method of any of examples 1 to 3, further comprising: determining that the one or more resources correspond to zero-power transmission resources for the first base station and the UE.

Example 5: The method of any of examples 1 to 4, further comprising: comparing a measured interference power corresponding to the reference signal to an interference power threshold, the interference status being determined based at least in part on the comparing.

Example 6: The method of example 5, wherein the interference status is determined to be valid based at least in part on the measured interference power exceeding the threshold in accordance with the comparing.

Example 7: The method of any of examples 5 and 6, wherein the interference status is determined to be invalid based at least in part on the measured interference power not exceeding the threshold in accordance with the comparing.

Example 8: The method of any of examples 1 to 7, wherein determining the interference status comprises: determining the interference status for a frequency band including a set of subbands based at least in part on the measurements in accordance with the indication.

Example 9: The method of any of examples 1 to 9, wherein determining the interference status comprises: determining the interference status for each subband of a plurality of subbands based at least in part on the measurements in accordance with the indication.

Example 10: The method of example 9, wherein transmitting the indication of the interference status comprises: transmitting a bitmap, each value of the bitmap corresponding to a respective subband of the plurality of subbands and indicating the interference status of the respective subband.

Example 11: The method of any of examples 1 to 10, wherein determining the interference status comprises: determining a quantized value of an interference level based at least in part on the measurements, wherein the quantized value is transmitted to the first base station.

Example 12: The method of any of examples 1 to 11, wherein receiving the control message comprises: receiving the control message that includes an indication of a resource block group size, the one or more resources begin determined based at least in part on the indication of the resource block group size.

Example 13: The method of example 12, further comprising: determining the resource block group size based at least in part on a default resource block group size in accordance with the indication of the resource block group size.

Example 14: The method of example 13, wherein the determined resource block size is a multiple of the default resource block group size in accordance with the indication of the resource block group size.

Example 15: The method of example 12, further comprising: determining the resource block group size in accordance with a value specified by the indication of the resource block group size.

Example 16: The method of any of examples 12 to 15, further comprising: determining a subband size of a subband for the interference status based at least in part on the indication of the resource block group size.

Example 17: the method of any of examples 1 to 16, wherein each the one or more resources corresponds to an instance the reference signal being transmitting using a different beam by the second base station.

Example 18: A method for wireless communications at a first base station, comprising: transmitting, to a user equipment (UE) served by the first base station, a control message that includes an indication to perform an interference measurement during one or more resources of the first base station that correspond to a beam of a second base station, the one or more resources of the first base station being time and frequency resources; receiving, from the UE, an indication of an interference status associated with and the one or more resources of the first base station and the beam of the second base station; and communicating with the UE based at least in part on the indication of the interference status.

Example 19: The method of example 19, wherein transmitting the control message comprises: including, within the control message, the indication to report the interference status corresponding to each resource of the one or more resources, each resource of the one or more resources corresponding to a reference signal resource of the second base station.

Example 20: The method of any of examples 18 and 19, wherein transmitting the control message comprises: including, within the control message, the indication to report the interference status corresponding to a combination of the one or more resources, each resource of the one or more resources corresponding to a reference signal resource of the second base station.

Example 21: The method of any of examples 18 to 20, further comprising: transmitting an indication that each of the one or more resources corresponds to zero-power transmission resources for the first base station and the UE.

Example 22: The method of any of examples 18 to 21, wherein transmitting the control message comprises: including, within the control message, the indication to report the interference status based at least in part on comparing a measured interference power to an interference power threshold.

Example 23: The method of any of examples 18 to 22, wherein transmitting the control message comprises: including, within the control message, the indication to report the interference status for a frequency band including a set a subbands, wherein the indication of the interference status is received for the frequency band in accordance with the indication.

Example 24: The method of any of examples 18 to 23, wherein transmitting the control message comprises: including, within the control message, the indication to report the interference status for each subband of a plurality of subbands, wherein the indication of the interference status is received for each subband of the plurality of subbands in accordance with the indication.

Example 25: The method of any of examples 18 to 24, wherein receiving the indication of the interference status comprises: receiving a bitmap, each value of the bitmap corresponding to a respective subband of a plurality of subbands and indicating the interference status of the respective subband.

Example 26: The method of any of examples 18 to 24, wherein receiving the indication of the interference status comprises: receiving an indication of a quantized value of an interference level.

Example 27: The method of any of examples 18 to 26, wherein transmitting the control message comprises: transmitting an indication of a resource block group size, the one or more resources begin determined based at least in part on the indication of the resource block group size.

Example 28: The method of example 27, wherein the indication of the resource block group size specifies a default resource block group size.

Example 29: The method of example 27, wherein the indication of the resource block group size specifies a multiple of a default resource block group size.

Example 30: The method of example 27, wherein the indication of the resource block group size specifies a value for the resource block group size.

Example 31: The method of any of examples 27 to 30, determining a subband size based at least in part on the indication of the resource block group size.

Example 32: The method of any of examples 18 to 31, wherein each the one or more resources corresponds to an instance a reference signal being transmitting using a different beam by the second base station.

Example 33: The method of any of examples 18 to 32, further comprising: transmitting, to the second base station, an indication of the interference status corresponding to the UE.

Example 34: The method of any of examples 18 to 33, further comprising: updating a table with an indication of the one or more resources, a cell associated with the second base station, a beam identifier of the beam, a beam corresponding to the first base station, the indication of the interference status, or a combination thereof.

Example 35: The method of any of examples 18 to 34, further comprising: receiving, from the second base station, an indication of the beam, the one or more resources, or a combination thereof.

Example 36: An apparatus comprising at least one means for performing a method of any of examples 1 to 35.

Example 37: An apparatus for wireless communications comprising a processor; memory coupled with the processor; and instructions stored in the memory and executable by the processor to cause the apparatus to perform a method of any of examples 1 to 35.

Example 38: A non-transitory computer-readable medium storing code for wireless communications, the code comprising instructions executable by a processor to perform a method of any of examples 1 to 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a first network device serving the UE, a control message that includes an indication to perform a measurement during one or more resources of the first network device that correspond to a beam of a second network device, the one or more resources of the first network device being time and frequency resource;
   measuring, based at least in part on receiving the control message, a reference signal transmitted via the beam of the second network device and during the one or more resources;
   determining an interference status that corresponds to the one or more resources of the first network device and the beam of the second network device based at least in part on measurements of the reference signal; and
   transmitting, to the first network device, an indication of the interference status associated with the one or more resources and the beam of the second network device, wherein the interference status comprises a first bit, and wherein a value of the first bit indicates whether the beam of the second network device interferes with communications between the UE and the first network device during the one or more resources.

2. The method of claim 1, further comprising:
   comparing a measured interference power corresponding to the reference signal to an interference power threshold, the interference status being determined based at least in part on the comparing.

3. The method of claim 1, wherein determining the interference status comprises:
   determining the interference status for a frequency band including a set of subbands based at least in part on the measurements in accordance with the indication.

4. The method of claim 1, wherein determining the interference status comprises:
   determining the interference status for each subband of a plurality of subbands based at least in part on the measurements in accordance with the indication.

5. The method of claim 4, wherein transmitting the indication of the interference status comprises:
   transmitting a bitmap comprising the first bit, each value of the bitmap corresponding to a respective subband of the plurality of subbands and indicating the interference status of the respective subband.

6. The method of claim 1, wherein receiving the control message comprises:
   receiving the control message that includes an indication of a resource block group size, the one or more resources begin determined based at least in part on the indication of the resource block group size.

7. The method of claim 1, wherein each the one or more resources corresponds to an instance the reference signal being transmitting using a different beam by the second network device.

8. A method for wireless communications at a first network device, comprising:
   transmitting, to a user equipment (UE) served by the first network device, a control message that includes an indication to perform an interference measurement during one or more resources of the first network device that correspond to a beam of a second network device, the one or more resources of the first network device being time and frequency resources;
   receiving, from the UE, an indication of an interference status associated with the one or more resources of the first network device and the beam of the second network device, wherein the interference status comprises a first bit, and wherein a value of the first bit indicates whether the beam of the second network device interferes with communications between the UE and the first network device during the one or more resources; and
   communicating with the UE based at least in part on the indication of the interference status.

9. The method of claim 8, wherein transmitting the control message comprises:
   including, within the control message, the indication to report the interference status corresponding to each resource of the one or more resources, each resource of the one or more resources corresponding to a reference signal resource of the second network device.

10. The method of claim 8, wherein transmitting the control message comprises:
    including, within the control message, the indication to report the interference status for a frequency band including a set a subbands, wherein the indication of the interference status is received for the frequency band in accordance with the indication.

11. The method of claim 8, wherein transmitting the control message comprises:
    including, within the control message, the indication to report the interference status for each subband of a plurality of subbands, wherein the indication of the interference status is received for each subband of the plurality of subbands in accordance with the indication.

12. The method of claim 8, wherein receiving the indication of the interference status comprises:
    receiving a bitmap comprising the first bit, each value of the bitmap corresponding to a respective subband of a plurality of subbands and indicating the interference status of the respective subband.

13. The method of claim 8, wherein transmitting the control message comprises:
    transmitting an indication of a resource block group size, the one or more resources being determined based at least in part on the indication of the resource block group size.

14. The method of claim 13, further comprising:

determining a subband size based at least in part on the indication of the resource block group size.

15. The method of claim 8, wherein each the one or more resources corresponds to an instance a reference signal being transmitting using a different beam by the second network device.

16. The method of claim 8, further comprising:
transmitting, to the second network device, an indication of the interference status corresponding to the UE.

17. The method of claim 8, further comprising:
receiving, from the second network device, an indication of the beam, the one or more resources, or a combination thereof.

18. An apparatus for wireless communications at a user equipment (UE), comprising:
at least one processor, at least one memory coupled with the at least one processor; and
instructions stored in the at least one memory and executable by the at least one processor to:
receive, from a first network device serving the UE, a control message that includes an indication to perform a measurement during one or more resources of the first network device that correspond to a beam of a second network device, the one or more resources of the first network device being time and frequency resource;
measure, based at least in part on receiving the control message, a reference signal transmitted via the beam of the second network device and during the one or more resources;
determine an interference status that corresponds to the one or more resources of the first network device and the beam of the second network device based at least in part on measurements of the reference signal; and
transmit, to the first network device, an indication of the interference status associated with the one or more resources and the beam of the second network device, wherein the interference status comprises a first bit, and wherein a value of the first bit indicates whether the beam of the second network device interferes with communications between the UE and the first network device during the one or more resources.

19. The apparatus of claim 18, wherein the instructions are further executable by the at least one processor to:
compare a measured interference power corresponding to the reference signal to an interference power threshold, the interference status being determined based at least in part on the comparing.

20. The apparatus of claim 18, wherein the instructions to determine the interference status are executable by the at least one processor to:
determine the interference status for a frequency band including a set of subbands based at least in part on the measurements in accordance with the indication.

21. The apparatus of claim 18, wherein the instructions to determine the interference status are executable by the at least one processor to:
determine the interference status for each subband of a plurality of subbands based at least in part on the measurements in accordance with the indication.

22. The apparatus of claim 21, wherein the instructions to transmit the indication of the interference status are executable by the at least one processor to:
transmit a bitmap comprising the first bit, each value of the bitmap corresponding to a respective subband of the plurality of subbands and indicating the interference status of the respective subband.

23. The apparatus of claim 18, wherein the instructions to receive the control message are executable by the at least one processor to:
receive the control message that includes an indication of a resource block group size, the one or more resources being determined based at least in part on the indication of the resource block group size.

24. The apparatus of claim 23, wherein the instructions are further executable by the at least one processor to:
determine a subband size of a subband for the interference status based at least in part on the indication of the resource block group size.

25. The apparatus of claim 18, wherein each the one or more resources corresponds to an instance the reference signal being transmitting using a different beam by the second network device.

26. An apparatus for wireless communications at a first network device, comprising:
at least one processor,
at least one memory coupled with the at least one processor; and
instructions stored in the at least one memory and executable by the at least one processor to:
transmit, to a user equipment (UE) served by the first network device, a control message that includes an indication to perform an interference measurement during one or more resources of the first network device that correspond to a beam of a second network device, the one or more resources of the first network device being time and frequency resources;
receive, from the UE, an indication of an interference status associated with the one or more resources of the first network device and the beam of the second network device, wherein the interference status comprises a first bit, and wherein a value of the first bit indicates whether the beam of the second network device interferes with communications between the UE and the first network device during the one or more resources; and
communicate with the UE based at least in part on the indication of the interference status.

27. The apparatus of claim 26, wherein the instructions to transmit the control message are executable by the at least one processor to:
include, within the control message, the indication to report the interference status corresponding to each resource of the one or more resources, each resource of the one or more resources corresponding to a reference signal resource of the second network device.

28. The apparatus of claim 26, wherein the instructions to transmit the control message are executable by the at least one processor to:
include, within the control message, the indication to report the interference status for a frequency band including a set a subbands, wherein the indication of the interference status is received for the frequency band in accordance with the indication.

29. The apparatus of claim 26, wherein the instructions to transmit the control message are executable by the at least one processor to:
include, within the control message, the indication to report the interference status for each subband of a plurality of subbands, wherein the indication of the interference status is received for each subband of the plurality of subbands in accordance with the indication.

30. The apparatus of claim 26, wherein the instructions to receive the indication of the interference status are executable by the at least one processor to:
receive a bitmap comprising the first bit, each value of the bitmap corresponding to a respective subband of a plurality of subbands and indicating the interference status of the respective subband.

31. The apparatus of claim 26, wherein the instructions to transmit the control message are executable by the at least one processor to:
transmit an indication of a resource block group size, the one or more resources being determined based at least in part on the indication of the resource block group size.

32. The apparatus of claim 31, wherein the instructions are further executable by the at least one processor to:
determine a subband size based at least in part on the indication of the resource block group size.

33. The apparatus of claim 26, wherein each the one or more resources corresponds to an instance a reference signal being transmitting using a different beam by the second network device.

34. The apparatus of claim 26, wherein the instructions are further executable by the at least one processor to:
transmit, to the second network device, an indication of the interference status corresponding to the UE.

35. The apparatus of claim 26, wherein the instructions are further executable by the at least one processor to:
receive, from the second network device, an indication of the beam, the one or more resources, or a combination thereof.

36. An apparatus for wireless communications at a user equipment (UE), comprising:
means for receiving, from a first network device serving the UE, a control message that includes an indication to perform a measurement during one or more resources of the first network device that correspond to a beam of a second network device, the one or more resources of the first network device being time and frequency resource;
means for measuring, based at least in part on receiving the control message, a reference signal transmitted via the beam of the second network device and during the one or more resources;
means for determining an interference status that corresponds to the one or more resources of the first network device and the beam of the second network device based at least in part on measurements of the reference signal; and
means for transmitting, to the first network device, an indication of the interference status associated with the one or more resources and the beam of the second network device, wherein the interference status comprises a first bit, and wherein a value of the first bit indicates whether the beam of the second network device interferes with communications between the UE and the first network device during the one or more resources.

37. The apparatus of claim 36, further comprising:
means for comparing a measured interference power corresponding to the reference signal to an interference power threshold, the interference status being determined based at least in part on the comparing.

38. The apparatus of claim 36, wherein the means for determining the interference status comprises:
means for determining the interference status for a frequency band including a set of subbands based at least in part on the measurements in accordance with the indication.

39. The apparatus of claim 36, wherein the means for determining the interference status comprises:
means for determining the interference status for each subband of a plurality of subbands based at least in part on the measurements in accordance with the indication.

40. The apparatus of claim 39, wherein the means for transmitting the indication of the interference status comprises:
means for transmitting a bitmap comprising the first bit, each value of the bitmap corresponding to a respective subband of the plurality of subbands and indicating the interference status of the respective subband.

41. The apparatus of claim 36, wherein the means for receiving the control message comprises:
means for receiving the control message that includes an indication of a resource block group size, the one or more resources being determined based at least in part on the indication of the resource block group size.

42. The apparatus of claim 41, further comprising:
means for determining a subband size of a subband for the interference status based at least in part on the indication of the resource block group size.

43. The apparatus of claim 36, wherein each the one or more resources corresponds to an instance the reference signal being transmitting using a different beam by the second network device.

44. An apparatus for wireless communications at a first network device, comprising:
means for transmitting, to a user equipment (UE) served by the first network device, a control message that includes an indication to perform an interference measurement during one or more resources of the first network device that correspond to a beam of a second network device, the one or more resources of the first network device being time and frequency resources;
means for receiving, from the UE, an indication of an interference status associated with the one or more resources of the first network device and the beam of the second network device, wherein the interference status comprises a first bit, and wherein a value of the first bit indicates whether the beam of the second network device interferes with communications between the UE and the first network device during the one or more resources; and
means for communicating with the UE based at least in part on the indication of the interference status.

45. The apparatus of claim 44, wherein the means for transmitting the control message comprises:
means for including, within the control message, the indication to report the interference status for a frequency band including a set a subbands, wherein the indication of the interference status is received for the frequency band in accordance with the indication.

46. The apparatus of claim 44, wherein the means for transmitting the control message comprises:
means for including, within the control message, the indication to report the interference status for each subband of a plurality of subbands, wherein the indication of the interference status is received for each subband of the plurality of subbands in accordance with the indication.

47. The apparatus of claim 44, wherein the means for receiving the indication of the interference status comprises:

means for receiving a bitmap comprising the first bit, each value of the bitmap corresponding to a respective subband of a plurality of subbands and indicating the interference status of the respective subband.

48. The apparatus of claim 44, wherein the means for transmitting the control message comprises:
means for transmitting an indication of a resource block group size, the one or more resources being determined based at least in part on the indication of the resource block group size.

49. The apparatus of claim 48, further comprising:
means for determining a subband size based at least in part on the indication of the resource block group size.

50. The apparatus of claim 44, wherein each the one or more resources corresponds to an instance a reference signal being transmitting using a different beam by the second network device.

51. The apparatus of claim 44, further comprising:
means for transmitting, to the second network device, an indication of the interference status corresponding to the UE.

52. The apparatus of claim 44, further comprising:
means for receiving, from the second network device, an indication of the beam, the one or more resources, or a combination thereof.

53. A non-transitory computer-readable medium storing code for wireless communications at a user equipment (UE), the code comprising instructions executable by at least one processor to:
receive, from a first network device serving the UE, a control message that includes an indication to perform a measurement during one or more resources of the first network device that correspond to a beam of a second network device, the one or more resources of the first network device being time and frequency resource;
measure, based at least in part on receiving the control message, a reference signal transmitted via the beam of the second network device and during the one or more resources;
determine an interference status that corresponds to the one or more resources of the first network device and the beam of the second network device based at least in part on measurements of the reference signal; and
transmit, to the first network device, an indication of the interference status associated with the one or more resources and the beam of the second network device, wherein the interference status comprises a first bit, and wherein a value of the first bit indicates whether the beam of the second network device interferes with communications between the UE and the first network device during the one or more resources.

* * * * *